United States Patent
Zakarian et al.

(10) Patent No.: US 7,519,673 B2
(45) Date of Patent: Apr. 14, 2009

(54) SYSTEM AND METHOD FOR CERTIFYING THE CONTENTS OF A CORRESPONDENCE

(75) Inventors: Edward Zakarian, West Palm Beach, FL (US); Serge Hairanian, West Palm Beach, FL (US)

(73) Assignee: Globalpex, Inc., West Palm Beach, FL (US)

( * ) Notice: Subject to any disclaimer, the term of this patent is extended or adjusted under 35 U.S.C. 154(b) by 274 days.

(21) Appl. No.: 11/451,094

(22) Filed: Jun. 12, 2006

(65) Prior Publication Data

US 2007/0288659 A1    Dec. 13, 2007

(51) Int. Cl.
*G06F 13/00* (2006.01)
(52) U.S. Cl. ...................................... 709/206
(58) Field of Classification Search ................. 709/206
See application file for complete search history.

(56) References Cited

U.S. PATENT DOCUMENTS 6,604,132 B1 * 8/2003 Hitt ............................. 709/206

2004/0139033 A1 * 7/2004 Amato ........................ 705/400

OTHER PUBLICATIONS

Search Report issued by PCT Patent Office on Jan. 22, 2009 in connection with corresponding PCT patent application No. PCT/US07/13134.

* cited by examiner

*Primary Examiner*—Robert B Harrell
(74) *Attorney, Agent, or Firm*—Ostrolenk, Faber, Gerb & Soffen, LLP

(57) ABSTRACT

In a preferred embodiment, a method and system are disclosed for certifying contents of a correspondence sent from a sender to a recipient. Steps and modules are provided for receiving by an information processor over a communication network an electronic file from a sending workstation associated with the correspondence. Further recipient information is received over the communication network that represents the recipient of the correspondence, and an electronic copy of the electronic file is preferably generated. The electronic copy includes identifying coded information. Thereafter, the coded electronic copy is output as a physical document, and then imaged to create an electronic imaged copy. The electronic imaged copy is stored in a database, and the physical document is delivered to the recipient. The electronic imaged copy is retained and stored in the database as a certification of physical document sent to the recipient.

32 Claims, 18 Drawing Sheets

SYSTEM AND METHOD FOR CERTIFYING THE CONTENTS OF A CORRESPONDENCE

FIELD OF THE INVENTION

The present invention relates generally to communication, and, more particularly, to certifying, authenticating and retaining correspondence.

BACKGROUND OF THE INVENTION

Many parties use conventional couriers, such as the U.S. Postal Service or private couriers such as FedEx, UPS, and DHL, in order to send correspondence/documentation to intended recipients. Although such couriers are frequently used, they do not guarantee compliance with many U.S. and International regulatory requirements, such as the Sarbanes-Oxley Act, U.S. Securities and Exchange Commission ("SEC") rulings, European Union ("EU") directives, the Health Insurance Portability and Accountability Act ("HIPAA"), or the like. The core requirements of such regulations often include corporate governance and controls with respect to the dissemination, retention and eventual destruction of corporate correspondence and documentation.

In response to various regulatory requirements, corporations often implement miscellaneous e-mail retention programs, but are not often able to implement appropriate solutions for traditional physical (paper-based) correspondence and mail. Prior art methods for sending physical correspondence and mail pose potentially serious risks to a corporation because the sending party has no legal way of proving what was actually mailed or sent. For example, the U.S. Postal Service provides certified mail or private courier services that only certify that a particular package was sent or received.

Unfortunately, sending mail via conventional prior art options (e.g., First Class Mail, Certified Mail or via overnight courier service) does not guarantee authentication and/or verification of what was actually sent. Therefore, parties sending correspondence are unable to record properly and permanently the documents/correspondence that were physically sent. This is due, in part, to the fact that no service provider in the prior art is able to exactly reproduce the contents of a particular package with any certainty nor with any third party validation.

Typically, in the prior art, a sender can only prove that an envelope was sent on a certain date, sent to a certain recipient via a certain service and was received on a certain date by a certain person. Current conventional mailing methods lack an ability to provide a sender with a full assurance that the contents of an envelope can be reproduced exactly.

SOX 302 and 404 compliance is not just a regulatory requirement; the Sarbanes-Oxley Act, HIPAA, SEC Act and others can be an opportunity to create a regulatory compliance solution that makes good governance a valued corporate asset. Leading publicly traded corporations understand this, particularly multi-nationals working hard to comply with myriad regulations in multiple regions around the globe. What these organizations need is a continuous assurance to not only preserve their current compliance investments, but to implement a sustainable and cost-effective regulatory compliance solution that is driven by business efficiencies and value.

Unfortunately, any party's lapse in securing, controlling and recording physical mail could potentially be subjected to stiff regulatory fines, legal claims, which may diminish the level of trust of your clients, customers and/or patients, should a specific piece of correspondence and/or documentation come into question or be subpoenaed in a civil litigation.

SUMMARY OF THE INVENTION

In a preferred embodiment, a method and system are disclosed for certifying contents of a correspondence sent from a sender to a recipient. Steps and modules are provided for receiving by an information processor over a communication network an electronic file from a sending workstation associated with the correspondence. Further recipient information is received over the communication network that represents the recipient of the correspondence, and an electronic copy of the electronic file is preferably generated. The electronic copy includes identifying coded information. Thereafter, the coded electronic copy is output as a physical document, and then imaged to create an electronic imaged copy. The electronic imaged copy is stored in a database, and the physical document is delivered to the recipient. The electronic imaged copy is retained and stored in the database as a certification of physical document sent to the recipient.

Other features and advantages of the present invention will become apparent from the following description of the invention, which refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF THE PREFERRED EMBODIMENTS

Figure 1:
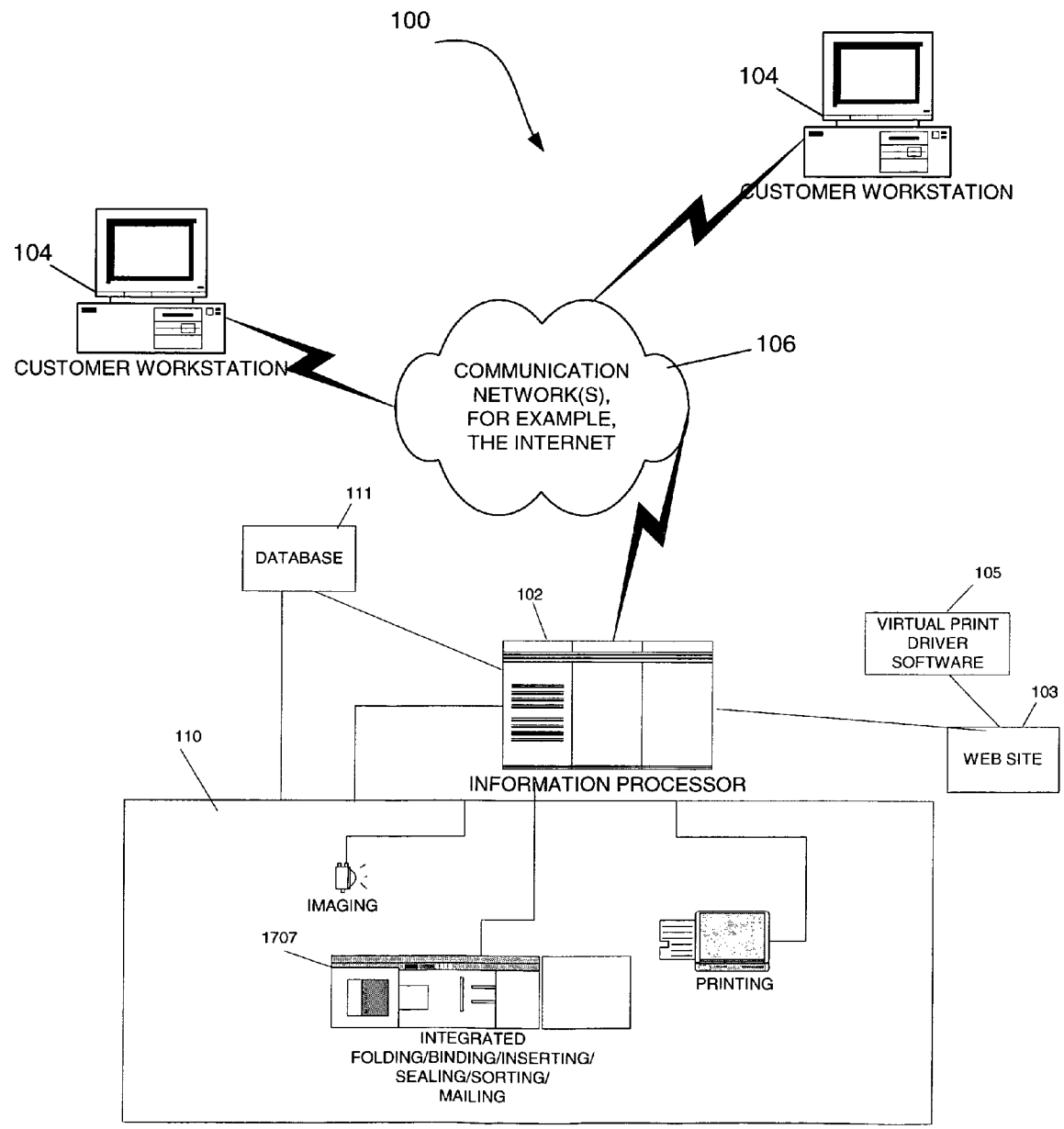
FIG. 1 shows an example hardware arrangement of a first preferred embodiment of the present invention.

In a preferred embodiment, the present invention provides a system and method for authenticating users and certifying correspondence such as letters, documents and other paper products, that are transmitted for example, by private carriers or the U.S. Postal Service. Preferably, the system and method include a substantially fully automated process that is designed to certify and authenticate the contents of each and every package sent in accordance with the teachings herein. For example, customers have the ability to send electronic and/or physical documents to anyone in the world with the full assurance of document integrity, retention & retrieval, digital imagery, receipt verification and recording, and authentication.

In accordance with the teachings herein, customers are provided with technological benefits and cost savings from enhanced document digital imaging, correspondence (e.g., mail) fulfillment, and document management/retention technologies.

As used herein, a "module" refers, generally, to one or more discrete components that contribute to the effectiveness of the present invention. Modules can operate or, alternatively, depend upon one or more other modules in order to function.

The certification service of the preferred embodiments is a substantially automated process including imaging and bar coding of a document sent by U.S. mail or other courier service, and further by converting the image(s) into an electronic file format which attaches relevant metadata. The metadata preferably includes a record of the document including its printing, packaging, shipping, and retention information. The end result is a cohesive, verifiable, and complete electronic record of the entire transmitted document. The record, which is preferably retained within a secure data facility, may be retrieved by a customer at any time to verify the contents of what was sent, the sending party, the time/date when the document was received, and the party who received it. Thus, certainty is provided in case an aspect of the document contents or delivery come into question. In addition, an enhanced document search and retrieval feature is preferably integrated in a platform significantly improves responsiveness to litigation discovery (including e-discovery) requests.

Although many of the examples and embodiments described herein refer specifically to paper documents, the invention is not so limited. Any correspondence can be transmitted using the features described herein. Moreover, as used herein, the term, "document," refers to any printed material.

In accordance with a preferred practice, users of the present invention are preferably provided with a low-priced overnight and other delivery services across the continental United States and overseas. As described in greater detail below, shippers are preferably queried for estimates substantially in real-time and the lowest price is preferably determined based on a cost-comparison. Cost-savings that are realized from receiving competitive bids from various couriers are preferably passed to the customer, thereby enabling a proprietor of the present invention the ability to provide the services described herein at affordable rates.

In one embodiment, documents to be sent to recipients via the present invention are received from senders in electronic form. Thereafter, each page of the document is bar coded, printed and then imaged prior to being packaged for delivery. The printed bar coded document that is converted into electronically formatted image(s) is preferably stored in a database. Further, each image of a document is preferably associated with metadata, which, for example, may include an entire record of the document including production stages of printing, packaging, shipping and file retention information. In a preferred embodiment, the process is accomplished substantially automatically, without human manipulation. It is generally believed by the inventor that reducing human involvement during processes associated with bar coding, printing, imaging, packaging and sending correspondences increases accuracy and makes for reliable document integrity.

Using the system and methods described herein, a cohesive, verifiable and complete electronic record of the entire document is provided. This electronic record is preferably in a tamper proof format, and stored in a secure data facility. Preferably, the record may be searched and retrieved on demand by any authorized personnel at any time and from any location where access to a communication network, such as the internet, is available. By providing a system and processes that takes a full, post print, image of the entire document, which is securely stored and recorded, including the complete tracking history of each and every express envelope sent, the services provided are complete. In this way, users, including corporations, are assured of compliance with complex and changing regulatory challenges, such as related to document retention.

Referring now to the drawings, in which like reference numerals refer to like elements, FIG. 1 shows an example hardware arrangement for certifying sealed envelope contents, and referred to generally as content certified and authenticated correspondence system 100. System 100 comprises at least one information processor 102, and at least one customer workstation 104, each of which are adapted to access and communicate over communication network 106. Information processor 102 preferably provides internet web site 103 that includes graphical screen controls for enabling registered users to be availed of the features described herein. As described in greater detail below, web site 103 preferably includes downloadable virtual print driver 105 that is used for formatting and/or transmitting documents to be transmitted from workstation 104 to information processor 102. Preferably, information processor 102 communicates with customer workstation 104 and receives instructions with respect to requests for certifying envelope contents.

As shown in FIG. 1, information processor 102 includes centralized mailing and messaging center 110, including inserting station 1707 (described below with reference to FIG. 17), that is operable to provide imaging, bar coding, printing, folding, binding, inserting, sealing and preparing for courier service for a document. Preferably centralized mailing and messaging center 110 is under the direct control of the proprietor of the information processor 102.

In the example shown in FIG. 1, centralized mailing and messaging center 110 preferably includes an output printer, imaging device, envelope preparing device and delivery mechanism. One skilled in the art will recognize that the hardware arrangement of centralized mailing and messaging center 110 illustrated in FIG. 1 is for example illustrative purposes only, and that centralized mailing and messaging center 110 may include fewer, more or other devices in alternative embodiments. For example, a centralized mailing and messaging center 110 may employ binding machine 118 to combine individual sheets. Also, the various devices associated with centralized mailing and messaging center 110 shown in FIG. 1, including binding machine are presented as separate and apart from the output printer. Of course, one skilled in the art will recognize that two or more of these devices may be integrated into a single device. For example, the output printer may have a series of attachments that comprise a binding machine.

Preferably, a convenient graphical user interface is provided that is intuitive and accessible by computing devices communicating over a communication network using standard web browser software. Preferably, the interface comprises graphical screen controls, such as icons, buttons, drop-down lists, text box controls or the like, and further is menu-driven and preferably provided in an integrated communications management suite which further comprises centralized mailing and messaging center 110.

Centralized mailing and messaging center 110 preferably centrally provides communications services, including in a corporate environment, as a fully hierarchical system giving "top to bottom" control over the use of various modules by corporate employees and other authorized personnel. Centralized mailing and messaging center 110 is preferably designed to allow managerial controls thereby providing a corporate customer with complete and detailed, on-demand logs covering relevant communication aspects offered within the centralized mailing and messaging center 110. By providing a substantially automated service, customers achieve and maintain compliance with various regulations such as: the Sarbanes-Oxley Act Sections 802 & 1102 (US); the Health Insurance Portability and Accountability Act (US); the Security and Exchange Commission Regulation 17a-4 (US); the NASD Rule 2210 (US); the New York Stock Exchange —NYSE Rule 472(US); the Federal Rules of Civil Procedure (US); the European Parliament And The Council Of The European Union Directive (95/46/ec); and Multi-Governmental Privacy laws. Of course, the invention can be tailored to ensure compliance with virtually any other regulatory or company requirement.

In a preferred embodiment, the user interface provided by centralized mailing and messaging center 110 enables users to monitor and control communications. The interface provides the user with a high level of integrity, security, ease and speed. Centralized mailing and messaging center 110, via information processor 102, preferably includes database 111 that enables the user to comply with various and potentially complex regulatory standards, for example, as set forth by the U.S. federal government. By using centralized mailing and messaging center 110, users can perform various actions such as sending, auditing, receiving, reporting, and retaining communications that are sent and/or received from a single, secured internet-based environment, at any time and from virtually anywhere on the globe. For example, users can perform such communication actions using the present invention. These and other features are described in greater detail below.

Furthermore, a service, referred to herein, generally, as "certified content authentication" assists a sender in achieving compliance with internal controls and records retention measures, such as required by the Sarbanes-Oxley Act, SEC rulings, EU Directives, HIPAA, or the like.

In addition to benefits provided with respect to compliance, certified content authentication enables senders to search for and retrieve copies of previously sent physical correspondence and documents easily, thereby eliminating a potential for fraudulent claims, for example, by recipients that a particular correspondence was not delivered or was incomplete. By relying on certified content authentication, senders have the ability to instantly establish the veracity of any claim of non-delivery, missing data, incompleteness or the like by a recipient, simply by using standard web browsing software. Users of the present invention are provided with a high degree of assurance, via a fully integrated document authentication and mail fulfillment service that tracks documents, that are received, coded, printed, imaged and packaged.

Using the system and processes described herein, senders and recipients of mailings have the ability to confirm the entire contents of a correspondence, for example, to confirm that an entire (or less than entire) document was included in a package. As noted above, this is accomplished by providing an image of the actual, entire correspondence taken before the correspondence was packaged and sent. In one embodiment, the e-mail includes a hyperlink that, when selected, displays an image of the correspondence as well as relevant metadata. In this embodiment, by clicking on the appropriate link provided in the e-mail message, the recipient acknowledges having seen the documents even before the physical correspondence has been delivered. In addition, all pertinent document information may be stored within a secure virtual document "vault" for varying retention periods, as prescribed by relevant federal regulatory Acts. The documents may be retrieved by any authorized person, preferably over a secure communication session using standard web browser software thereby enabling the person to view the document at any given time, and from any location around the globe. The document and corresponding information, such as shipping details, can not be altered and/or deleted from the secure vault. As part of the regulatory requirements, the documents are preferably automatically deleted at the end of a mandatory retention period, unless a user chooses to retain documents for longer a period of time.

Information processor 102 preferably includes all databases necessary to support the present invention. However, it is contemplated that information processor 102 can access any required database via communication network 106 or any other communication network to which information processor 102 may be coupled. Communication network 106 is preferably a global public communication network such as the Internet, but can also be a wide area network (WAN), local area network (LAN), or other network that enables two or more computers to communicate with each other.

In a preferred embodiment, information processor 102 and customer workstation 104 are any devices that are capable of sending and receiving data across communication network 106, e.g., mainframe computers, mini computers, personal computers, laptop computers, a personal digital assistants (PDA) and Internet access devices such as Web TV. In addition, information processors 102 and customer workstation 104 are preferably equipped with a web browser, such as MICROSOFT INTERNET EXPLORER, NETSCAPE NAVIGATOR and the like. Information processors 102 and customer workstations 104 are coupled to communication network 106 using any known data communication networking technology.

Figure 2:
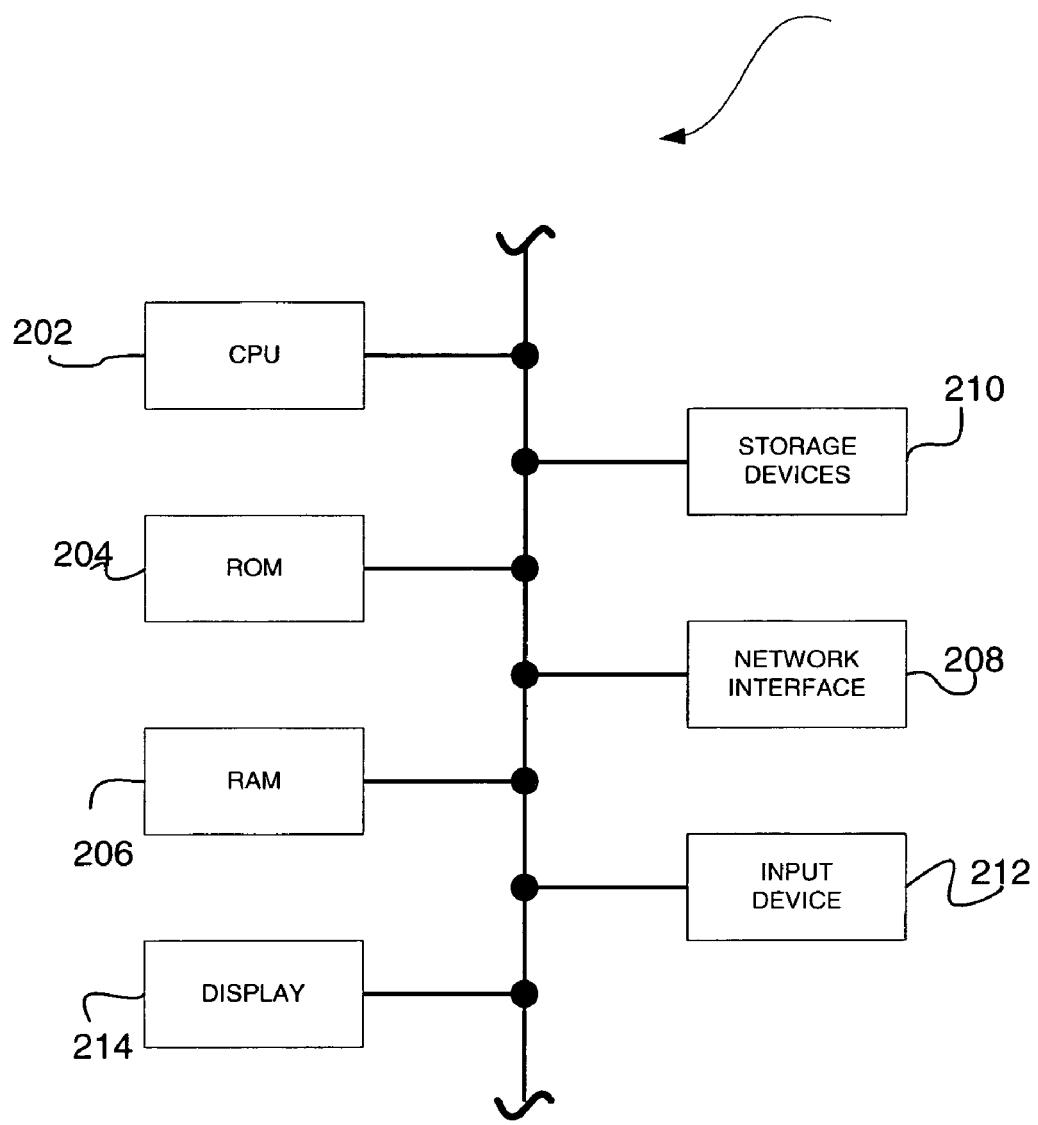
FIG. 2 illustrates the functional elements of an example information processor and/or workstation.

As shown in FIG. 2, the functional elements of an example information processor 102 and/or workstation 104 are shown, and include one or more central processing units (CPU) 202 used to execute software code and control the operation of information processor 102, read-only memory (ROM) 204, random access memory (RAM) 206, one or more network interfaces 208 to transmit and receive data to and from other computing devices across a communication network, storage devices 210 such as a hard disk drive, floppy disk drive, tape drive, CD ROM or DVD for storing program code, databases and application data, one or more input devices 212 such as a keyboard, mouse, track ball, microphone and the like, and a display 214.

The various components of information processor 102 need not be physically contained within the same chassis or even located in a single location. For example, storage device 210 may be located at a site which is remote from the remaining elements of information processor 102, and may even be connected to CPU 202 across communication network 106 via network interface 208. Information processor 102 preferably includes a memory equipped with sufficient storage to provide the necessary databases, forums, and other community services as well as acting as a web server for communicating hypertext markup language (HTML), Java applets, Active-X control programs or the like to customer workstations 104. Information processors 102 are arranged with components, for example, those shown in FIG. 2, suitable for the expected operating environment of information processor 102. The CPU(s) 202, network interface(s) 208 and memory and storage devices are selected to ensure that capacities are arranged to accommodate expected demand.

As used herein, the terms "link" and "hyperlink" refer to a selectable connection from one or more words, pictures or other information objects to others in which the selectable connection is presented within the web browser. The information object can include sound and/or motion video. Selection is typically made by "clicking" on the link using an input device such as a mouse, track ball, touch screen and the like. Of course, one of ordinary skill in the art will appreciate that any method by which an object presented on the screen can be selected is sufficient.

The functional elements of information processor 102 shown in FIG. 2 are of the same categories of functional elements present in customer workstation 104. However, not all elements need be present in the customer workstation 104. For example, storage devices 210, in the case of PDA's, and the capacities of the various elements are arranged to accommodate the expected user demand. Moreover, CPU 202 in customer workstation 104 may be a smaller capacity CPU than the CPU present in the information processor 102. Similarly, it is likely that the information processor 102 will include storage devices of a much higher capacity than storage devices present in customer workstation 104. Of course, one of ordinary skill in the art will understand that the capabilities of the functional elements can be adjusted as needed.

The nature of the invention is such that one skilled in the art of writing computer executable code (i.e., software) can implement the described functions using one or more of a combination of popular computer programming languages and developing environments including, but not limited to C, C++, Visual Basic, JAVA, HTML, XML, ACTIVE SERVER PAGES, JAVA server pages, servlets, and a plurality web site development applications.

Although the present invention is described by way of example herein and in terms of a web-based system using web browsers and a web site server (information processor 102), system 100 is not limited to the above configuration. It is contemplated that system 100 is arranged such that customer workstation 104 communicate with and display data received from information processor 102, using any known communication and display method, for example, using a non-Internet browser WINDOWS viewer coupled with a local area network protocol such as the Internet Packet Exchange (IPX), dial-up, third-party, private network or a value added network (VAN).

It is further contemplated that any suitable operating system can be used on information processor 102 and customer workstation 104, for example, DOS, WINDOWS 3.x, WINDOWS 95, WINDOWS 98, WINDOWS NT, WINDOWS 2000, WINDOWS ME, WINDOWS CE, WINDOWS POCKET PC, WINDOWS XP, MAC OS, UNIX, LINUX, PALM OS POCKET PC and any other suitable operating system.

As used herein, references to displaying data on information processor 102 and customer workstation 104 refers to the process of communicating data to the terminal across communication network 106 and processing the data such that the data is viewed on the display 214, for example by using a web browser and the like. As is common with web browsing software, the display screen on customer workstation 104 presents sites within the system 100 such that a user can proceed from site to site within the system by selecting a desired link.

Therefore, each user's experience with system 100 is based on the order with which he/she progresses through the display screens. Graphic controls are preferably available in the display screens and modules to initiate data processes, and to provide convenient navigation between the display screens and modules of system 100. In other words, because the system is not completely hierarchical in its arrangement of display screens, users can proceed from area to area without the need to "backtrack" through a series of display screens. For that reason, and unless stated otherwise, the following discussion is not intended to represent any sequential operation steps, but rather to illustrate the components of system 100.

As used herein, the term "proprietor" refers, generally, to an owner/operator of a device, such as information processor 102. A proprietor does not have to be in physical proximity of the device in order to exercise control over it. Also as used herein, a proprietor refers to a party (e.g., an individual, company, corporation, etc.) who exercises control over the content and features provided on a web site and/or information processor 102. Further, a "customer" refers, generally, to an individual, business or other party that contracts for services described herein, typically provided via a proprietor.

Preferably, information processor 102 provides a production web site 103 to which visitors can connect. Production web site 103 is available to anyone who is able to establish a communication session with the information processor 102, for example, using a standard web browsing software application. Once the session is established, the user is preferably prompted to enter a user name and password to enable the user to provide proper authorization to access features for registered customers who have contracted for the services provided by the proprietor of the production web site 103.

In accordance with the teachings herein, content certified and authenticated mail system 100 preferably enables customers outside of the continental U.S to benefit from the low overnight rates realized by United States clients, when addressing the mail to a continental U.S. address. Preferably, correspondence may be delivered overnight or standard service regardless where the correspondence originates. In accordance with a preferred business method, customers around the world of the proprietor realize cost savings and efficient document distribution. Also preferably, correspondence tracking is available for customers of proprietor of information processor 102. Correspondence tracking and delivery details are preferably added to an electronic file associated with the delivered document, and stored within database 111.

As noted above, the present invention addresses customer responsibility with regard to state and federal document regulations. A particularly demanding aspect of state and federal regulations regards document retention and archiving practices. Accordingly, comprehensive solutions are preferably provided to ensure compliance with such regulations. Centralized mailing and messaging center 110 offers customers an array of document retention, search and retrieval options, and document archival options. Documents can be searched and retrieved easily over a convenient and intuitive user interface, thereby obviating a need for specialized computer knowledge or training.

Preferably, documents are retained for various time-periods, ranging a few days to over 30 years, depending on a customer's needs and/or corresponding regulatory requirement. Preferably, a customer has an option to archive documents at the end of a mandated retention period, or the client can initially choose to purge documents automatically following completion of a required retention period.

Thus, the retention and archiving features of the present invention eliminate guesswork and calculation errors surrounding important regulatory compliance requirements.

In a preferred embodiment, each document prepared by centralized mailing and messaging center 110 for processing, shipping and retention is automatically issued a 2-dimensional("2D") barcode, as known in the art. The 2D format is preferred because substantially more information can be encoded into a 2D bar code than in a ID barcode.

The 2D barcode is preferably printed on each and every page of a document, and can thereafter be referenced for document tracking and retrieval. The 2D barcode for each document preferably comprises various information elements, for example: document ID, current page number, total number of pages, single sided/double sided. Using this information, other information related to the document stored in the database 111 can be retrieved. Of course, one skilled in the art will recognize that other information can be embedded in the bar code, as known in the art.

A particularly valuable feature of the 2D symbology is the ability to retrieve data from the bar code, even in case the bar code suffers from physical damage. This is achieved by including redundancy in the completed symbol (2D). The redundancy can allow recovery from as much as 40% damage to the symbol itself. Thus, the teachings herein employ state of the art technologies in order to protect and ensure the safety of data/documents and technology evolves, new efficiency and safety features will be implemented, as needed, as will become evident to one skilled in the art. Therefore, and as described above, although the many of the descriptions herein refer to current hardware and software embodiments, the present invention is not so limited.

In addition to assisting customers to achieve regulatory compliance, centralized mailing and messaging center 110 provides customers with benefits of a technological convergence of prevalent forms of communication (i.e., physical mail, e-mail, video conferencing, voice conferencing, communication management, instant messaging, facsimile and voice) into one fully integrated, audible system, and including state of the art document retention and reporting features. Centralized mailing and messaging center 110 enables customers to send, receive, retain, restrict access to, audit, report on, immediately retrieve, and manage their daily communications preferably in a secure internet based session, anywhere in the world. All of the above are preferably provided in addition to document management tools.

Moreover, centralized mailing and messaging center 110 provides inbound mail, certified e-mail, instant messaging, certified facsimile, video conferencing, voice conferencing, certified invoicing, file storage, and outbound mail retention services all with communication management features, as described herein. In this way, centralized mailing and messaging center 110 provides customers with an ability to maintain compliance with various requirements, including: internal controls, records retention, timely retrieval, and privacy restrictions incorporated within recent regulatory mandates. By ensuring compliance, centralized mailing and messaging center 110 restricts and tracks access to sensitive documents, monitors usage of e-mail/physical mail/facsimiles. Further, e-mail, mail, fax, instant message, and voice mail messages are preferably retained, and document/message retrieval is expedited, for example, for enhanced responsiveness to litigation discovery requests.

In an embodiment, a data entry display form is provided to a user for composing and submitting an e-mail message. As known in the art, for example, a web-based form is provided that includes text box controls enabling a user to submit a recipient's e-mail address, a subject line, and a body of an e-mail letter. A graphical screen control, such as a button, is further provided that, when selected, invokes a mailto or similar command, as known in the art. Unlike typical prior art web-based e-mail forms, however, the e-mail letter drafted by the user is not directly transmitted to the e-mail address provided in the recipient's e-mail address control. Instead, the e-mail is transmitted to centralized mailing and messaging center 110, where it is processed in accordance with the teachings herein. For example, the e-mail is modified to include a bar code on each page, the e-mail is printed, imaged, and stored. Thereafter, the modified e-mail is forwarded to the e-mail address originally provided in the recipient's e-mail address control. In one embodiment, the e-mail address provided in the recipient's e-mail address control is verified before the e-mail message is sent.

Thus, in a preferred embodiment, the present invention includes an ability to send and receive content certified e-mails to centralized mailing and messaging center 110 from anyone around the globe. The entire e-mail file, including relevant recorded information is stored securely, in compliance with various regulatory requirements.

When a user sends a certified e-mail, he can purchase an option, such as "enhanced certified e-mail," which includes a personal identification number and a prompt for the recipient to enter a telephone number. System 100 preferably locks the link such that access to the document is not yet provided. System 100 preferably calls the telephone number and asks the recipient to enter the personal information number. Thereafter, the recipient states his name and attests that he is the intended recipient of the e-mail. The recipient is recorded, and, thereafter, the link is preferably unlocked and the user gains access to the e-mail. Moreover, security measures are employed, such as known in the art, and the user's internet protocol address is stored.

Furthermore, the content certification process ensures that e-mail correspondence cannot be tampered with after having been sent. Further, e-mail correspondence cannot be removed/deleted until a predefined retention period has lapsed. Thereafter, e-mail correspondence is automatically deleted, unless a user wishes to retain a copy using the option to extend the retention period.

Figure 3:
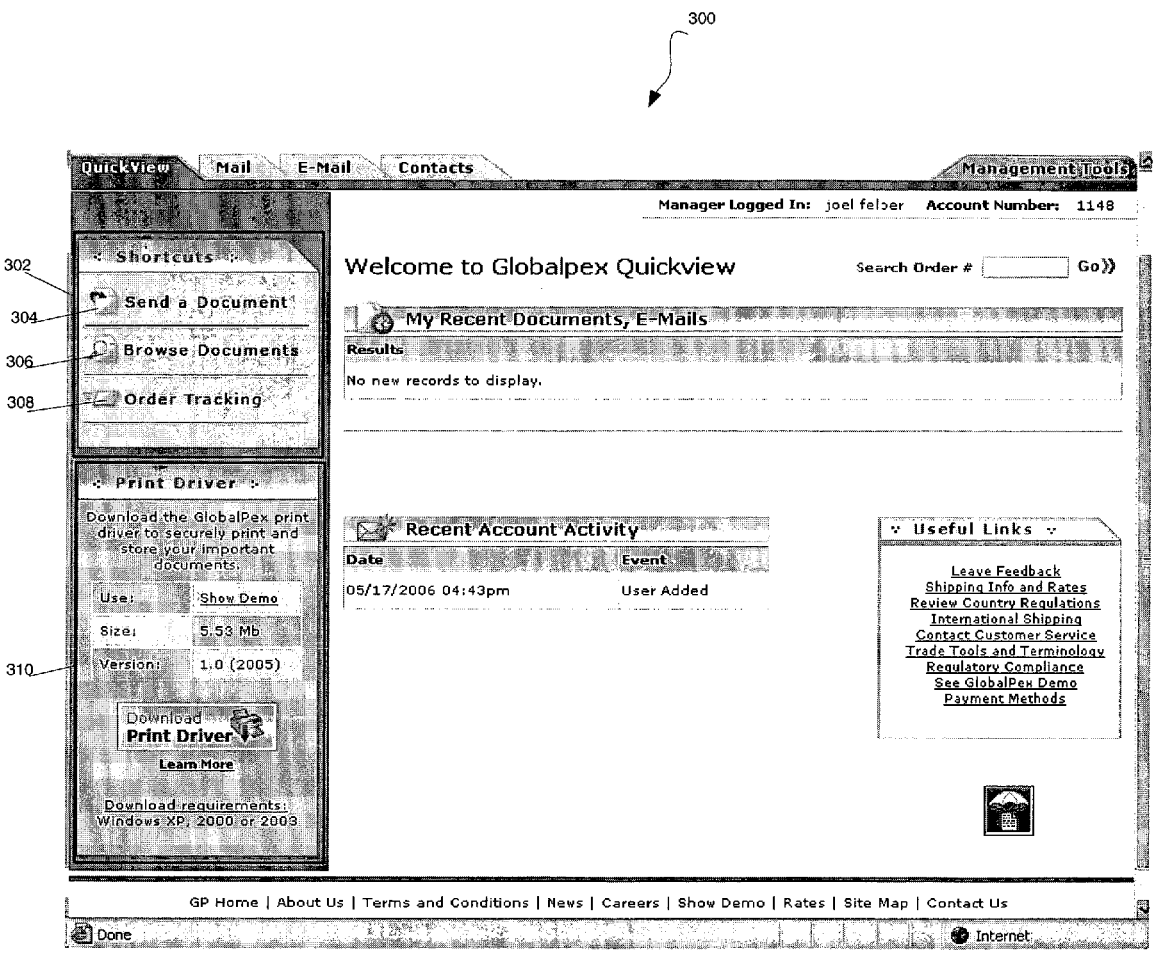
FIG. 3 includes an example display screen that is provided in accordance with a preferred embodiment.

FIG. 3 includes an example display screen 300 that is provided in accordance with a preferred embodiment. Display screen 300 includes sections 302 and 310, which may be provided in various other display screens illustrated and described herein. For example, display screen 300 includes shortcuts section 302 that comprises selectable choices for various options. In the example shown in FIG. 3, shortcuts section 302 includes Send A Document icon 304 that, when selected, causes information processor 102 to present display screens operable for a user to order a document delivery process (described in greater detail below, with reference to FIGS. 5-15). Shortcut section 302 further includes Browse Documents icon 306 that enables a user to review previously sent documents that are or will be delivered in accordance with the teachings herein. Further Order Tracking icon 308 is provided in section 302 that enables a user to track a pending document order.

Also shown in display screen 300, Print Driver Download section 310 is provided that enables a user to download virtual print driver 105 for convenient access to many of the features described herein. Print Driver Download section 310 includes a link to a virtual print driver 105 that, when installed on workstation 104, enables a user to place an order with information processor 102 once the user outputs a document to a "virtual" printer associated with the driver 105. Once the user prints the document to the virtual printer, the output is preferably saved as an ADOBE PORTABLE DOCUMENT FORMAT ("PDF") file, and a communication session is preferably established with information processor 102 to enable the user to make selections regarding delivery of the document, such as described below with reference to FIGS. 5-15. For example, after the PDF is created, the user's default web browser software application is automatically launched, and the browser is pointed to a uniform resource locator ("URL") to web site 103 information processor 102.

In a preferred embodiment, PDF files are uploaded to information processor 102 from workstation 104. Virtual print driver 105 preferably generates a copy of the document from a first format (e.g., spreadsheet, image, database, word processor) to be formatted as a PDF. In this way, the user is provided with a convenient mechanism to convert a document from one format to PDF, and a convenient communication path to information processor 102 is also provided.

Figure 4:
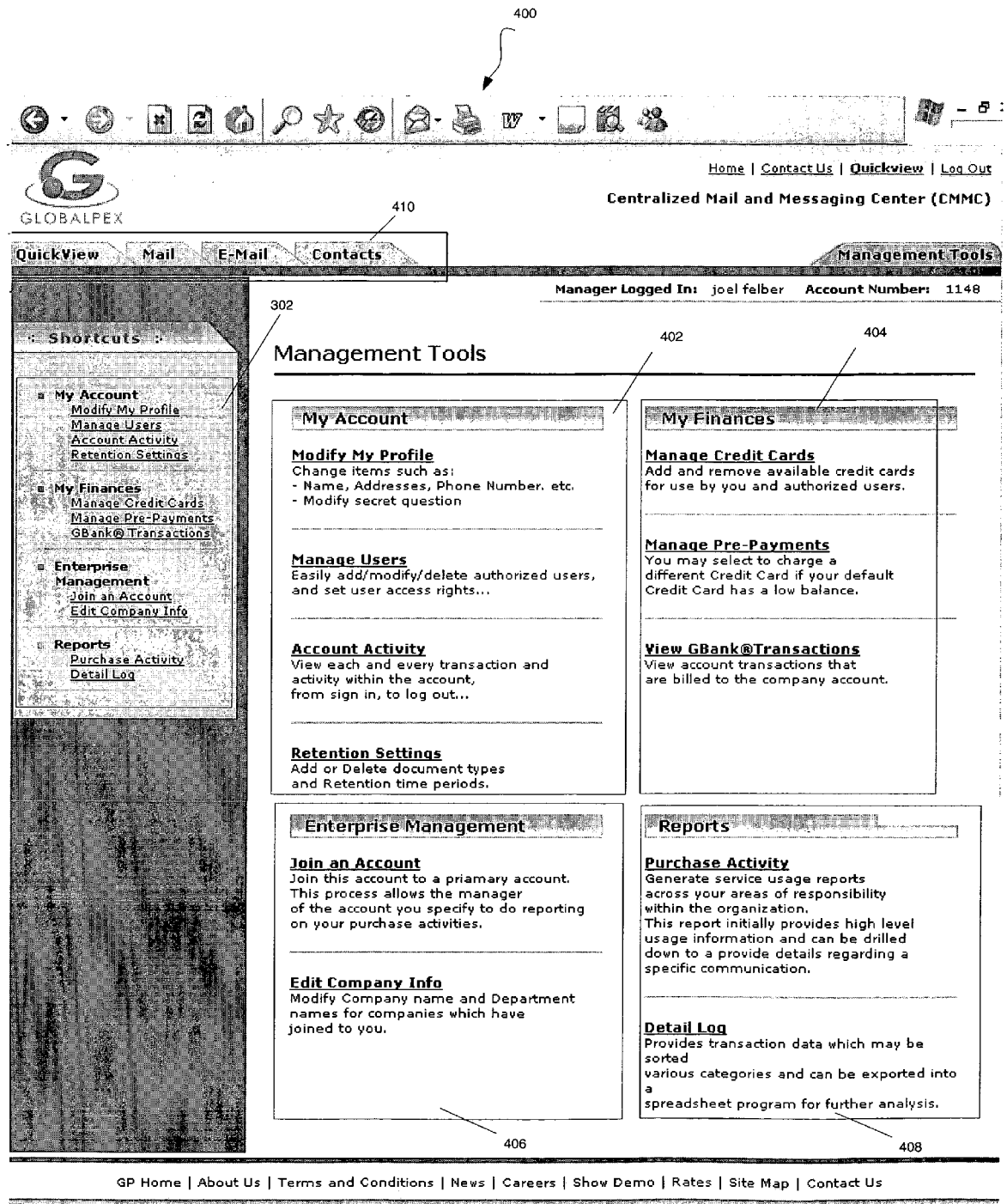
FIG. 4 shows an example account management display screen in accordance with a preferred embodiment.

With reference now to FIG. 4, an example account management display screen 400 is shown and usable for an authorized user to add or modify an existing account. As shown in manage account section 402, selectable text controls (e.g., hyperlinks) are provided that enable a user to perform various functions. As shown in FIG. 4, manage account section 402 includes selectable choices for modifying a user profile, managing users, view account activity and manage document retention settings. Financial Information section 404 includes selectable choices for managing credit card credit card information for use by users, managing pre-payment options, and viewing account transactions. In Enterprise Management section 406, selectable choices are provided to enable a user to combine two accounts together and to manage company and department demographic information. Further, Report section 408 includes options to generate reports, including to report purchase activity and transaction details.

As described above with regard to display screens provided in accordance with a preferred embodiment, display 400 also includes shortcuts section 302. However, unlike shortcuts section 302 shown in FIG. 3, shortcuts section 302 in display screen 400 offers a user selections also provided in account section 402, financial information section 404, enterprise management section 406 and report section 408. By providing all of the selections in a compact, convenient area, a user is provided with a convenient interface for operating the present invention. Further, display screen 400 includes tabs 410 enabling a user to navigate to other display screens providing functionality in accordance with the teachings herein.

FIGS. 5-15 illustrate example display screens provided to a user who is in the course of sending a document correspondence in accordance with a preferred embodiment.

Figure 5:
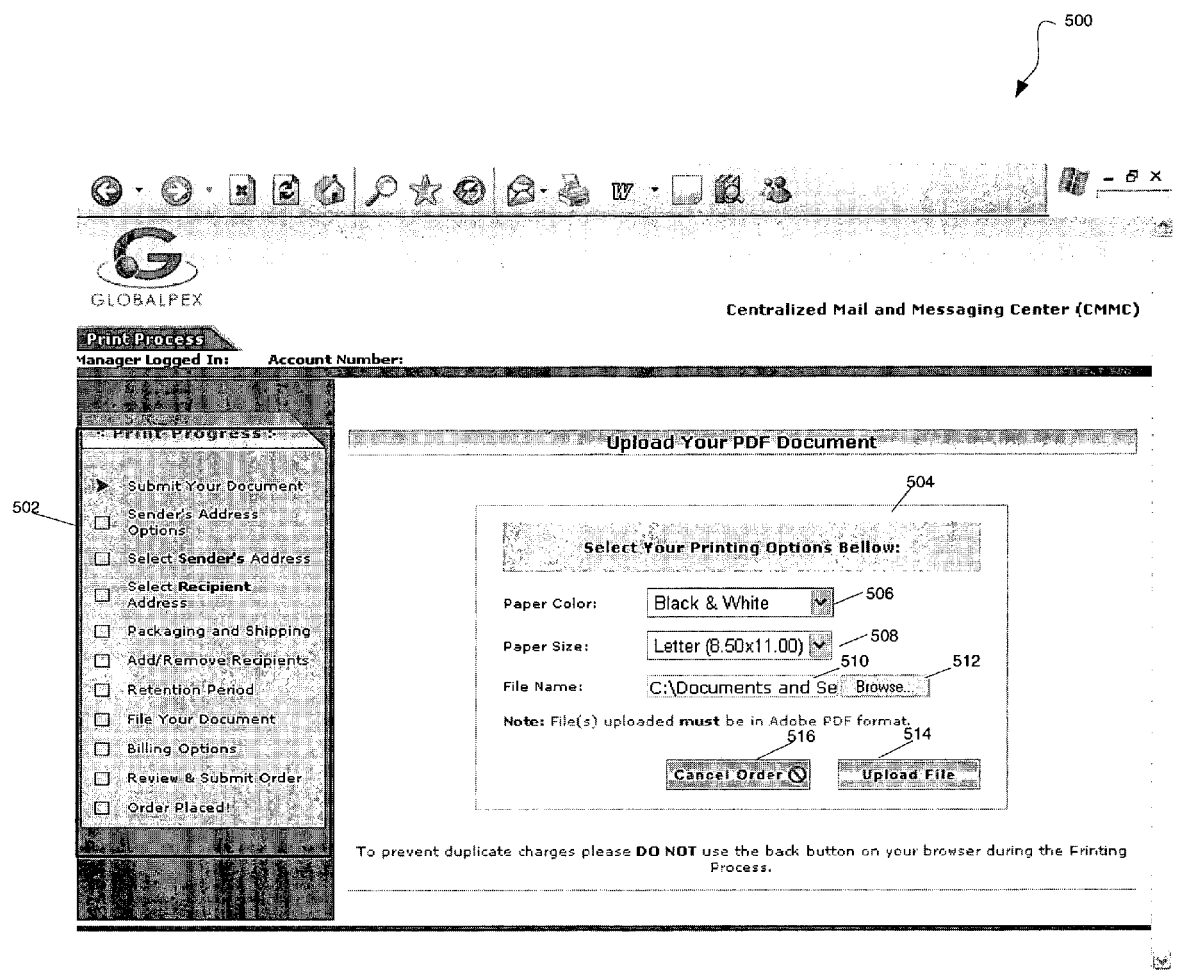
FIG. 5 illustrates a display screen that is preferably presented to a user who initiates a process to send a document in accordance with a preferred embodiment.

FIG. 5 illustrates display screen 500 that is preferably presented to a user who selects Send A Document hyperlink 304 in shortcuts section 302 (FIG. 3). Once selected, display screen 500 is presented which includes print progress view section 502 that identifies the steps associated with placing an order in accordance a preferred embodiment, and further identifies the steps the user has completed, the step the user is performing, and the steps the user has yet to complete. As shown in display screen 500, print progress view section 502 identifies the status of steps associated with submitting a document, selecting a sender's address options, selecting the sender's address, selecting the receiver's address, selecting packaging and shipment options, adding/removing recipients, defining/selecting a document retention period, filing the document, selecting billing options, reviewing/selecting an order, and placing the order. In the embodiment shown in FIG. 5, the options shown in print progress view section 502 are not selectable (e.g., formatted as hyperlinks), but instead operate to display the progress of an order. Moreover, each option has a checkbox placed adjacent thereto that, when selected, indicates a completed task.

Continuing with reference to FIG. 5, upload section 504 includes graphical screen controls (e.g., textboxes, drop-down lists, checkboxes, buttons, etc.) for defining characteristics related to the document the user desires to send. For example, controls are provided for a user to make selections regarding characteristics of the document correspondence. For example, Image Color drop-down list 506 is selectable to define whether the document is black & white or color. Further Paper Size drop-down list 508 is selectable to define a preferred paper size, and File Name text box 510 is provided to enable a user to submit the name of the document, preferably including the drive and pathname. Also preferably included is Browse button 512 that enables the user to navigate a particular folder (or directory) on workstation 104 where the document is stored, and, thereafter, to select the document name to be uploaded. Using Browse button 512, the user does not leave to recall long and potentially complicated path/directory names where the document is stored, or the name of the document.

Once the full name of the file is displayed in file name text box 510, the user selects Upload File button 514 to cause the selected file to be transmitted to information processor 102. Alternatively, the user selects Cancel Order button 516 to abort the process. As noted above, in a preferred embodiment, the user uploads a document formatted as a PDF, preferably generated via virtual print driver 105. Of course one skilled in the art will recognize that any file format can be support in accordance with various embodiments without departing from the teachings herein.

In a preferred embodiment, any format document has optical character recognition process performed thereon. Once performed, an electronic document, such as formatted as a PDF can be searchable, as known in the art. This is particularly useful, for example, e-discovery requirements.

Figure 6:
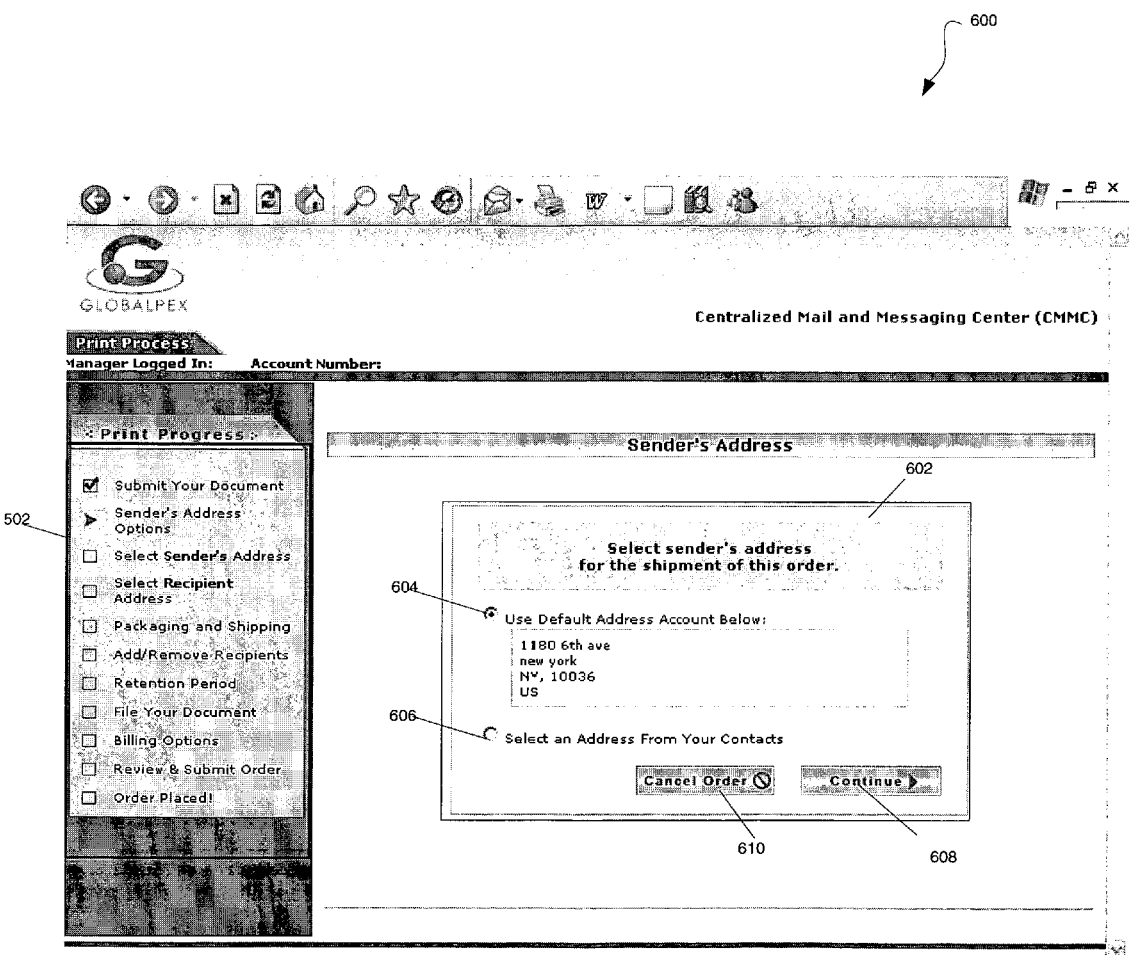
FIG. 6 displays an example display screen displayed after a user selects a file to be uploaded from workstation to be sent in accordance with a preferred embodiment.

FIG. 6 illustrates an example display screen 600 and displayed after the user selects a file to be uploaded from workstation 104, as described above with reference to FIG. 5. As shown in FIG. 6, print progress view section 502 indicates that the document has been previously submitted. In sender's address section 602, the user selects Default Address radio button 604, for selecting an address previously submitted by the user during an initial registration process. Alternatively, the user selects Contact Address radio button 606 which enables the user to select an address from a list of contacts. After the user selects either radio button 604 or 606, the user selects Continue button 608 to proceed with the order process or, alternatively, selects Cancel Order button 610 to abort the process.

Figure 7:
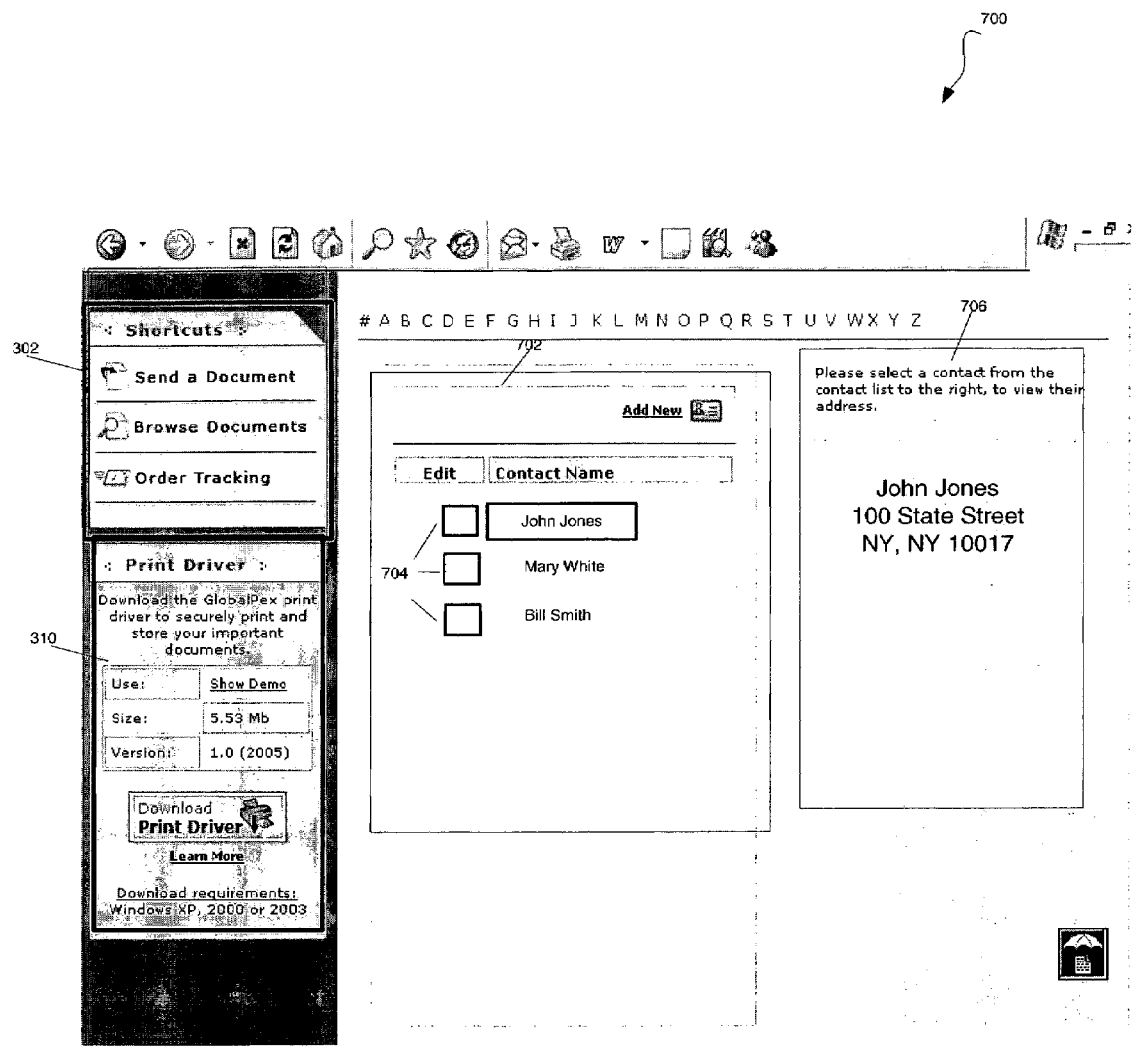
FIG. 7 illustrates example display screen for selecting recipients from an existing electronic address book.

FIG. 7 illustrates example display screen 700 for selecting recipients from an existing electronic address book, such as known in the art. Preferably, display screen 700 is displayed after the user selects radio button 606 (FIG. 6), and thereafter selects Continue button 608. In the example shown in FIG. 7, three contacts are displayed in contact selection section 702, John Jones, Mary White and Bill Smith. Adjacent to each name is Edit button control 704 which, when selected, preferably causes information processor 102 to display add/edit contact display screen 800 (described in greater detail below, with reference to FIG. 8). In a preferred embodiment, when a contact name is selected in contact selection section 702, corresponding address and contact information is preferably displayed in address section 706. In the example shown in FIG. 7, John Jones is selected in section 702, with John Jones' corresponding address information displayed in section 704. Also displayed in FIG. 7 are shortcuts section 302 and print driver section 310 (FIG. 3).

Figure 8:
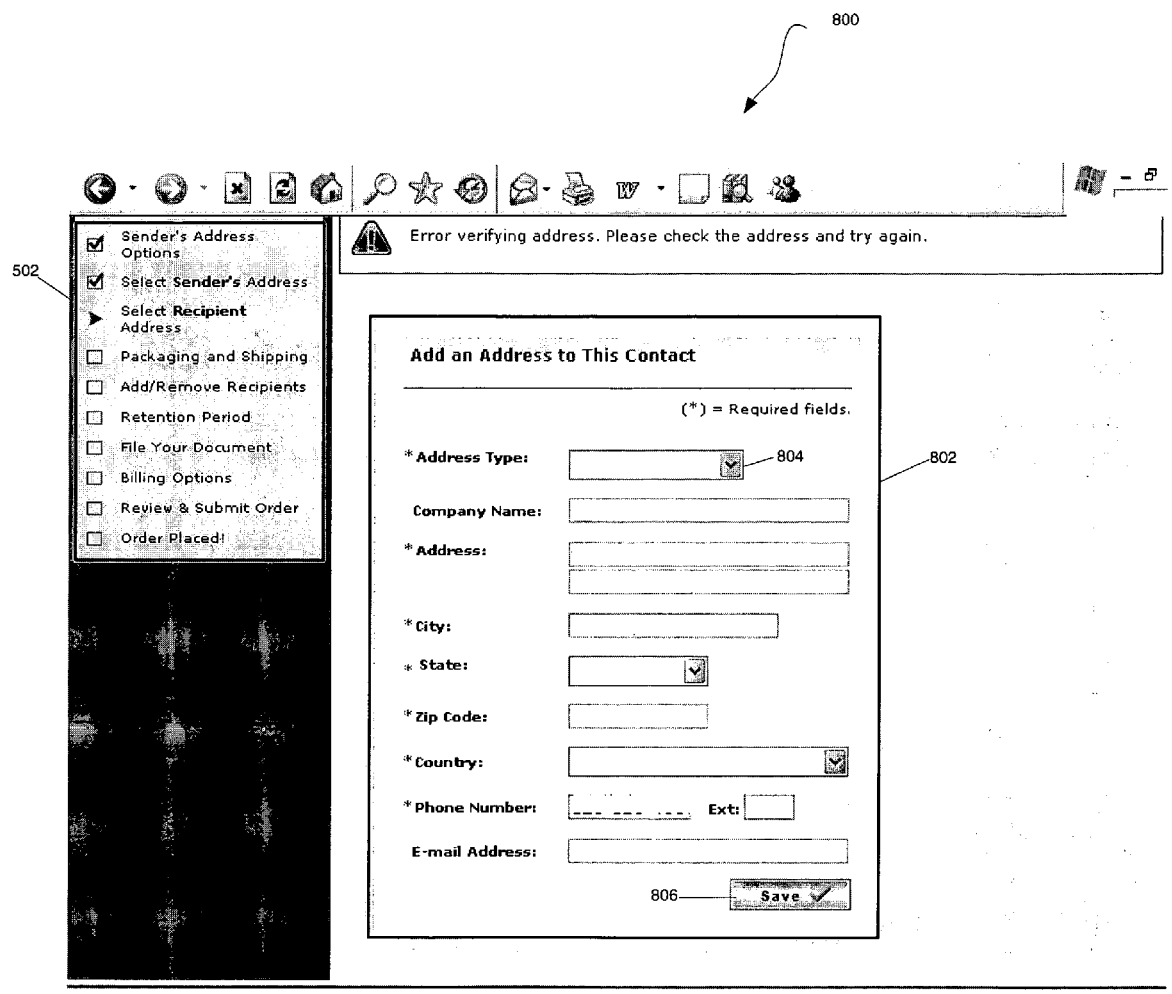
FIG. 8 illustrates an example add/edit contact display screen that is preferably provided to enable a user to add/edit a contact to a database.

FIG. 8 illustrates an example add/edit contact display screen 800 that is preferably provided to enable a user to add/edit a contact to database 111 and provided after a user selects a contact and, thereafter, selects Edit button control 704 (FIG. 7). Included in FIG. 8 is add/edit contact section 802 that includes Address Type drop-down list 804 enabling a user to categorize the contact. In the example shown in FIG. 8, the contact is categorized as a "business" contact. Other graphical screen controls are provided for entering a company name, and for entering corresponding demographic information (e.g., street, P.O., city, state, zip code, country, telephone number and e-mail address). After the user is satisfied with the submitted entries, the user selects Save button 806 to save the entries in database 111. Also displayed in FIG. 8 is print progress view section 502 that indicates user's progress with respect to an order being placed with the information processor 102.

Figure 9A:
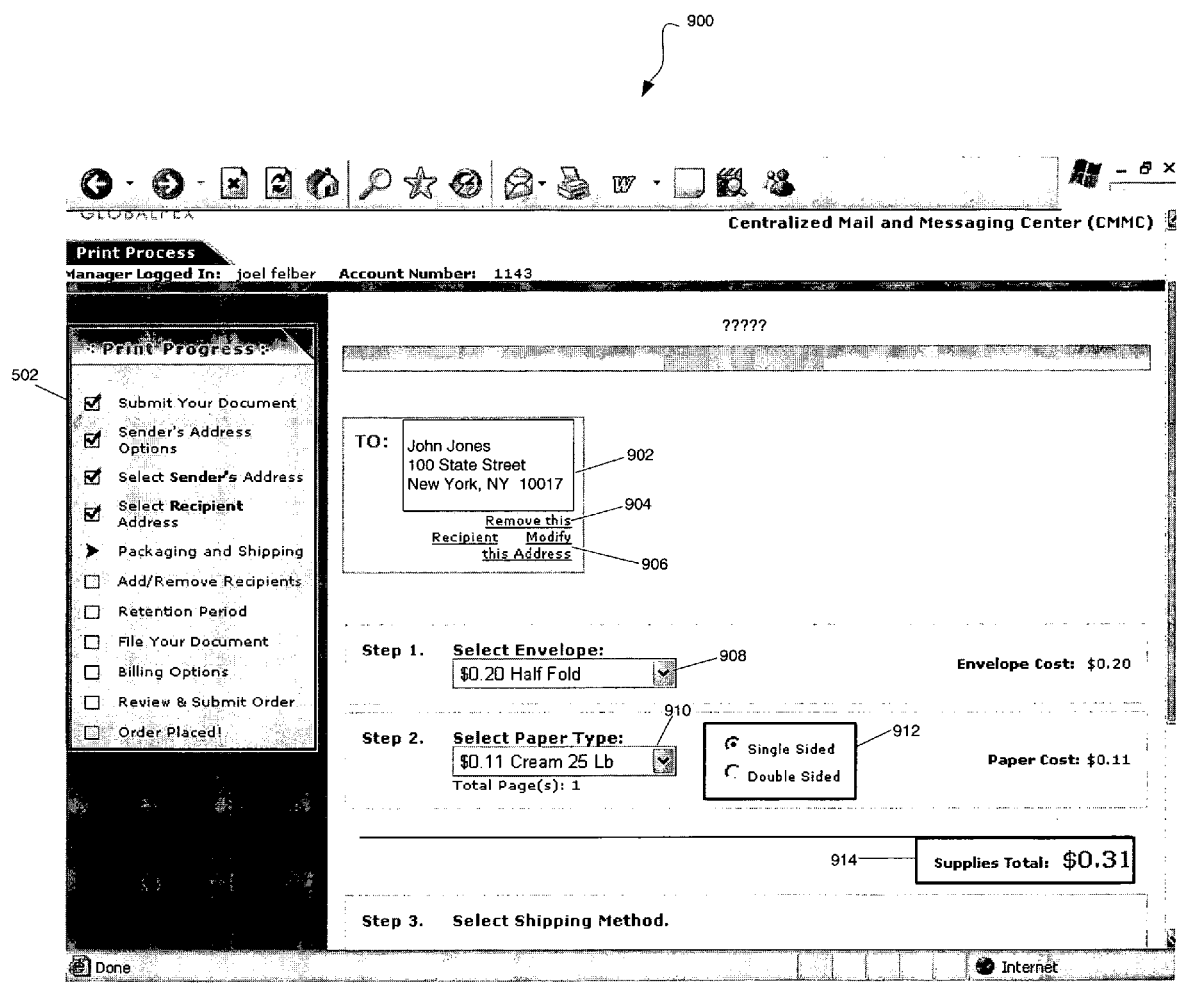
FIGS. 9A and 9B show an example display screen that enables a user to make packaging and shipping information selections.
Figure 9B:
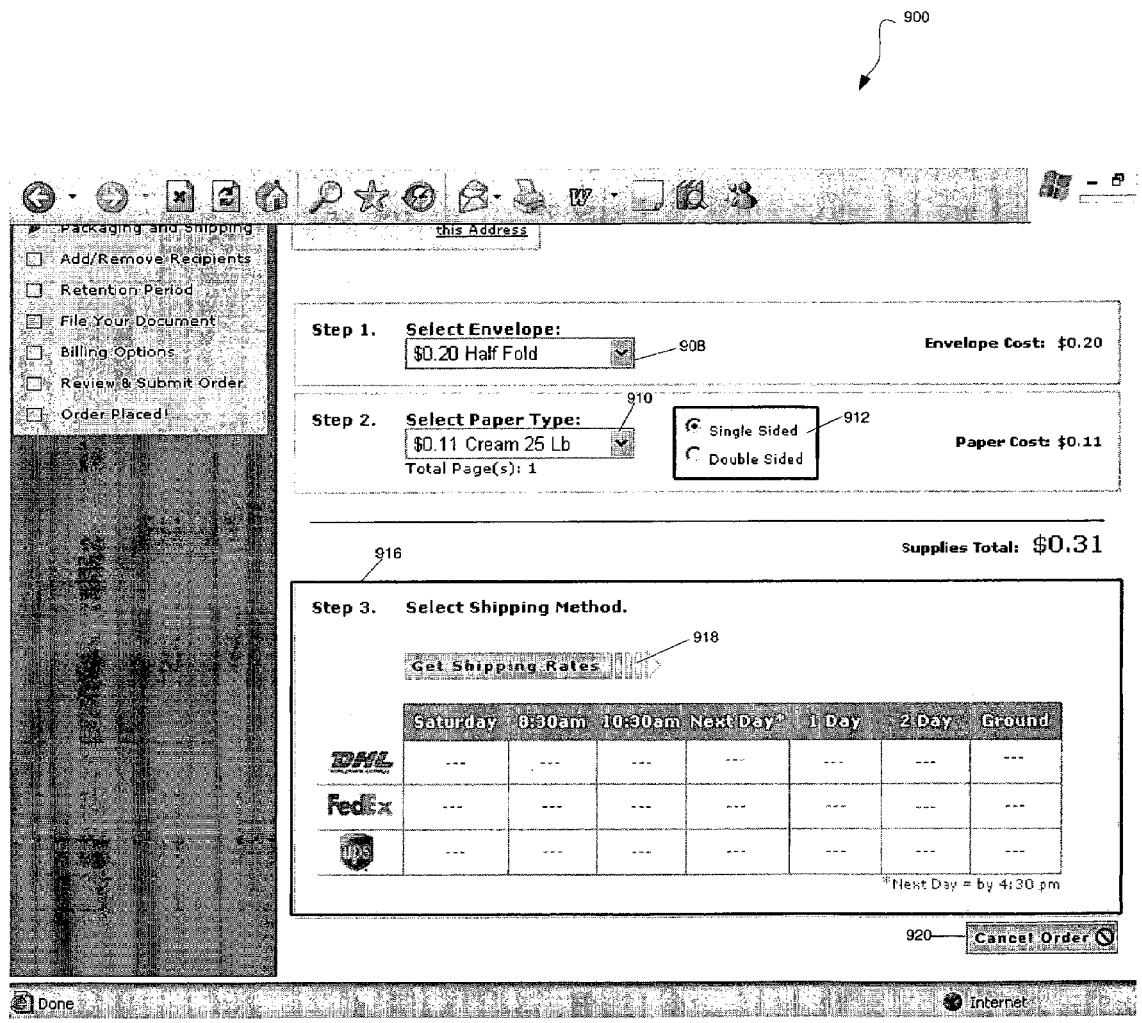

FIGS. 9A and 9B illustrate an example display screen 900 that enables a user to make packaging and shipping information selections. As shown in FIG. 9A, recipient information section 902 is provided to enable the sender to define a recipient. In FIG. 9A, John Jones is indicated as the intended recipient. Remove hyperlink 904, when selected, causes information processor 102 to remove the selected contact as a recipient. Alternatively, the user can select Modify Address hyperlink 906 that enables the user to modify the recipient's address, such as described above with respect to FIG. 8.

After the user is satisfied that the recipient information is correct, the user selects an option for packaging information. For example, the user selects Envelope drop-down list 908 to select an envelope dimension or other type of envelope. Moreover, the user selects Paper Type drop-down list 910 and one or two sided radio buttons 912 to select a type of paper. Preferably, costs associated with the packaging information is automatically calculated and displayed for the user, and a total supplies cost is displayed in section 914.

Referring now to FIG. 9B, shipping method section 916 is provided to enable a user to request information processor 102 retrieve competitive shipping rates from a plurality of couriers. In the example shown in FIG. 9B, DHL, FEDEX and UPS are the selected couriers. Of course, one skilled in the art will recognize that any party providing courier services can be requested to submit quotes for providing shipping services. Also as shown in FIG. 9B, shipping method section 916 includes a tabular grid representing various delivery options provided by the respective couriers. For example, options for Saturday delivery, 8:30 a.m. delivery, 10:30 a.m. delivery, Next Day delivery, 1 day delivery, 2 day delivery and ground delivery options are shown. In the example shown in FIG. 9B, when the user is ready to submit the request for shipping rates to the respective couriers, the user selects Get Shipping Rates icon 918. Alternatively, the user can select Cancel Order 920 to abort the order.

After the user selects get shipping rates icon 918, information processor 102 preferably queries the respective couriers for price information. The respective couriers preferably submit substantially real-time responses to the query and the grid in section 916 is preferably populated with price information from the couriers for the respective delivery options. In the example shown in FIG. 10, DHL returned no pricing information, FEDEX and UPS offer competitive rates, FEDEX offering less expensive delivery rates for 8:30 a.m., but more expensive delivery rates for 10:30 a.m., Next Day, and 1 Day delivery. In the example shown in FIG. 10, UPS did not return any pricing information for 2 Day delivery, and no courier returned pricing information for Saturday delivery or Ground delivery. All of the prices in the example section 916 shown in FIG. 10 are preferably formatted as selectable links that, when selected, cause information processor 102 to award the order to the selected courier for the selected delivery option.

Figure 10:
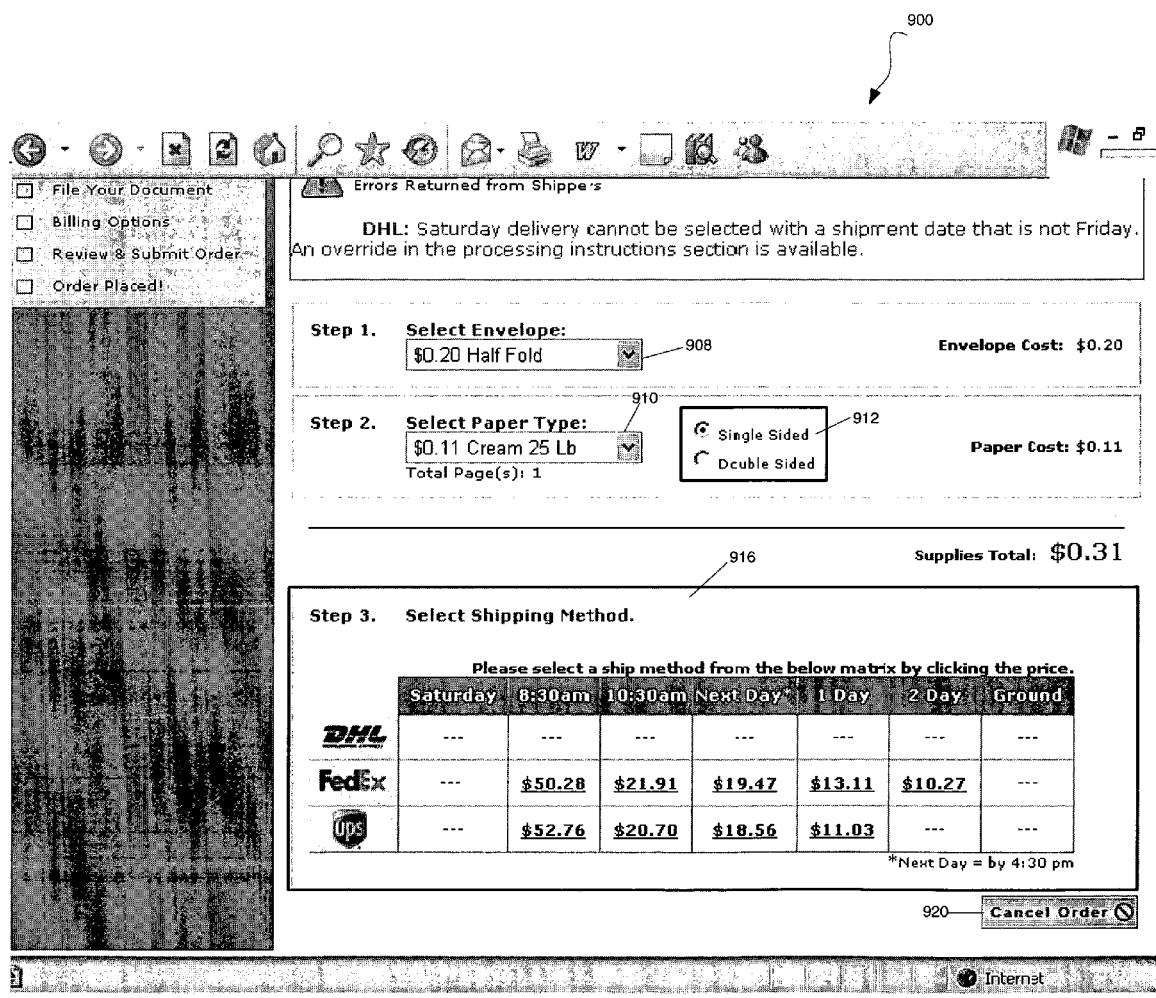
FIG. 10 shows shipping courier pricing information returned by various couriers in response to a query therefor in accordance with a preferred embodiment.
Figure 11:
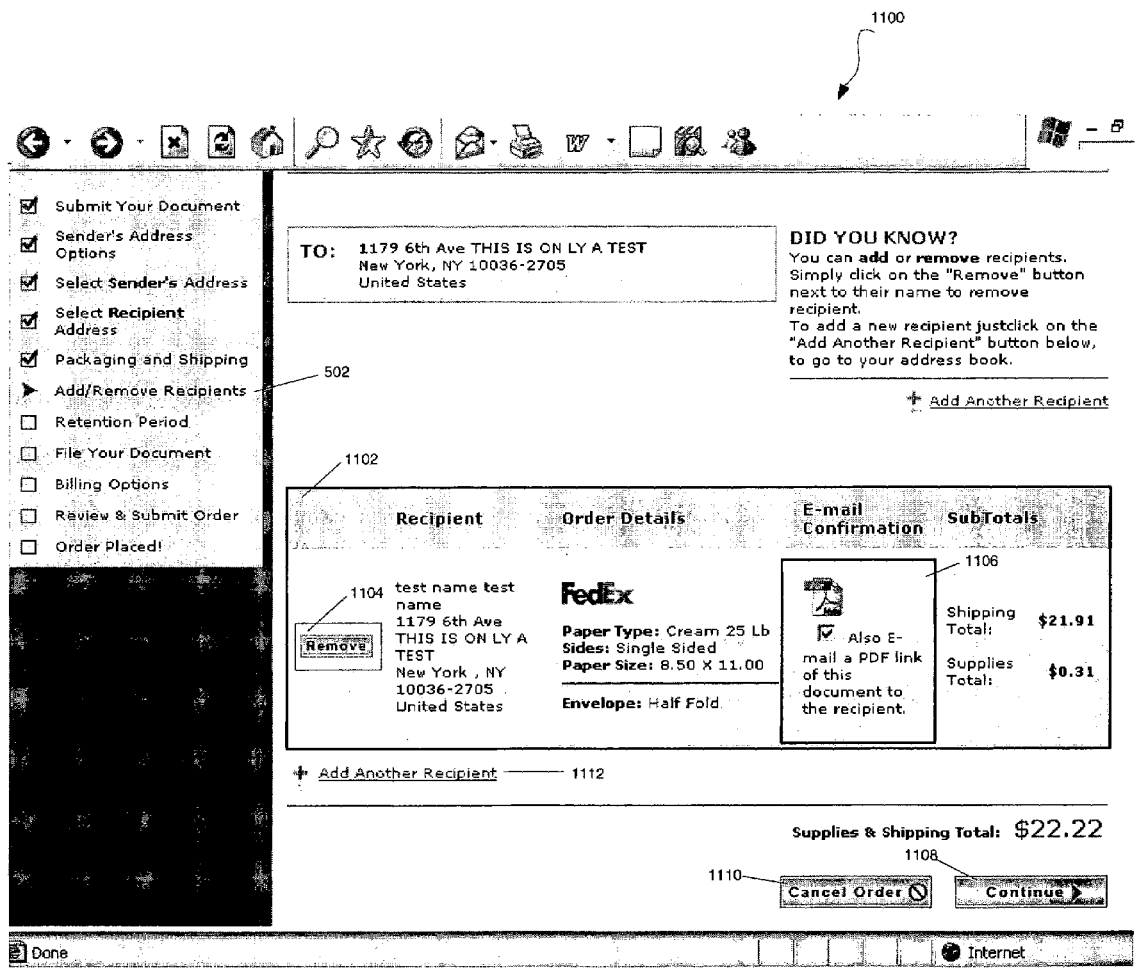
FIG. 11 illustrates an example display screen that is presented to a user who selects a courier for delivery of correspondence in accordance with a preferred embodiment.

FIG. 11 illustrates example display screen 1100 that is preferably presented to a user who selects a link displayed in the grid shown in shipping method section 916. As shown in the example in FIG. 11, order confirmation section 1102 identifies the recipient, order details, e-mail confirmation and subtotal costs associated with the selection previously made in shipping method section 902. In the example shown in FIG. 11, the user previously selected FEDEX as the courier and a 10:30 a.m. delivery. A comparison of shipping costs shown in FIG. 10 indicate that the 10:30 a.m. delivery by FEDEX is not the least expensive choice. This example demonstrates the flexibility of the present invention in that the user has the ability to select a desired shipping/delivery time and not be automatically assigned a courier by information processor 102 such as the least expensive courier.

Continuing with reference to FIG. 11, in case the user changes his mind and decides not to hire the selected courier, the user selects Remove icon 1104 to remove the selection and review the previously submitted prices and couriers in shipping method section 916, such as shown in FIG. 10. As noted above, the user can select Email Confirmation checkbox 1106 to instruct information processor 102 to transmit an e-mail message to the recipient that includes a link to an electronic (preferably PDF) copy of the document. This enables the recipient to review an electronic version of the document prior to the document being physically delivered.

Once the user is satisfied with the options displayed in order confirmation section 1102, the user selects Continue button control 1108 Alternatively, the user can select Cancel Order 1110 to abort the process. Moreover, the user can select Add Another Recipient hyperlink 1112 to select additional recipients of the document. Using hyperlink 1112 the user can select a plurality of parties to receive the document. After the user selects Continue button 1108, the user defines documentation retention information with respect to the document.

Figure 12:
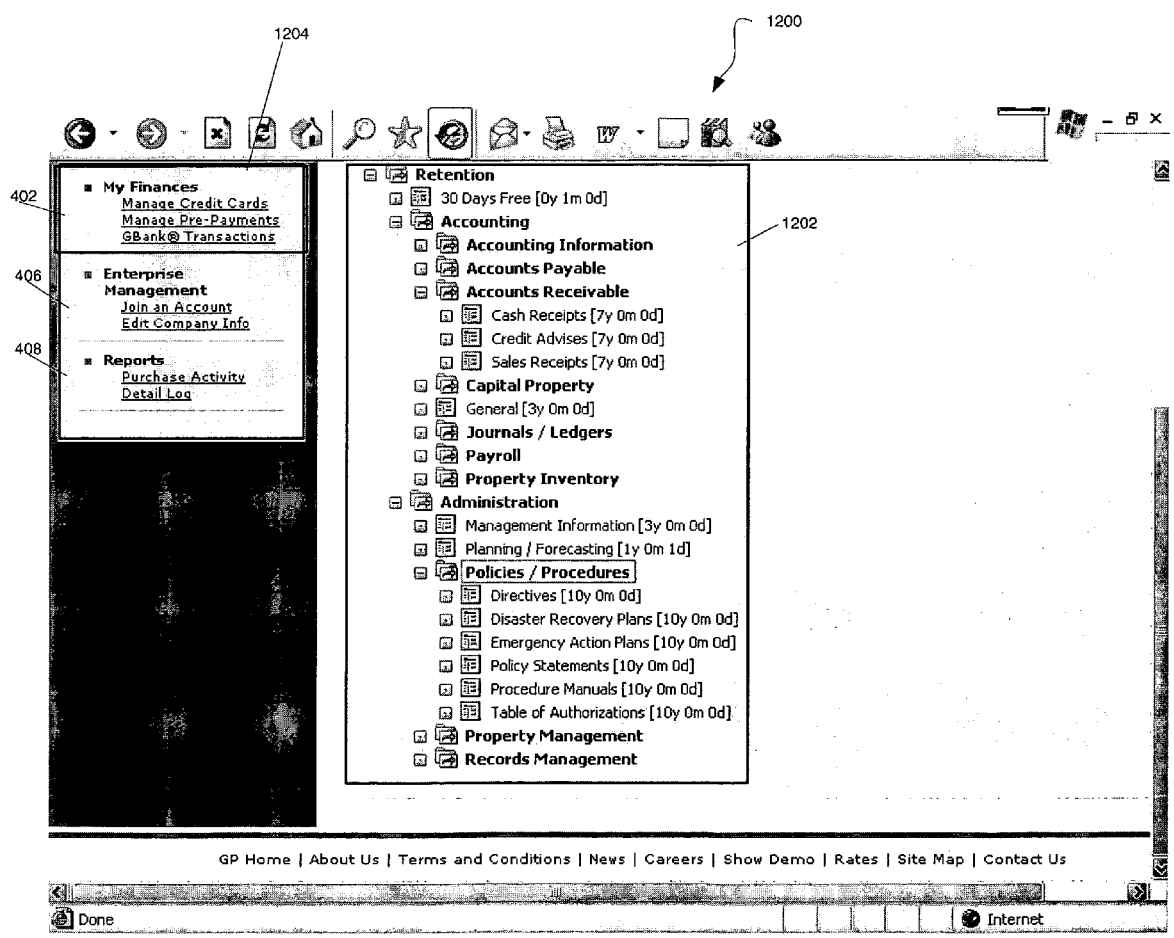
FIG. 12 shows an example document retention definition display screen that is preferably provided after a user selects a courier and delivery schedule for sending correspondence in accordance with an example embodiment.

FIG. 12 illustrates an example document retention definition display screen 1200 that is preferably provided after a user selects a courier and delivery schedule for sending correspondence in accordance with the teachings herein. In order to ensure compliance with regulatory and other requirements associated with document retention, users select an appropriate retention period for documents, preferably during the process of selecting a recipient and courier for delivery. In the example shown in FIG. 12, the user selects in document retention selection section 1202 options that categorize the document and a corresponding document retention period therefor. For example, in case the correspondence regards an emergency action plan, the user selects an option directed to emergency action plans and a corresponding retention time period of ten years.

In the example shown in FIG. 12, a tree-like hierarchical structure is displayed that is organized by business departments (e.g., "Accounting" and "Administration"). Under the general departmental categories are categorical options for documents associated with the respective departments. For example, document categories associated with the department, "Administration," include "Management Information," "Planning/Forecasting," "Policies/Procedures," "Property Management," and "Records Management." Under the respective document categories in FIG. 12 are particular document types. For example, under the document category, "Policies/Procedures," is an option for "Emergency Action Plans."

In a preferred embodiment, the tree-like structure shown is customizable by a properly authorized user to assign new categories, subcategories and document types. For example, the authorized user can assign a new subcategory within the category, "Administration," by selecting the "Administration" option (e.g., by "right-clicking" thereon, as known in the art), and selecting a context-menu selection (also as known in the art) for adding a subcategory (not shown). Using this interface, the user can define new categories, subcategories, document types and corresponding retention periods.

One skilled in the art will recognize that many alternative user interface options are available without departing from the spirit and teachings herein. For example, button controls may be provided that cause information processor 102 to display one or more data entry forms for the authorized user to define category, subcategory, document types and retention periods. Alternatively, formatted data (e.g., in comma-delimited ASCII text files, spreadsheets or any other known data format) may be imported and used to automatically populate category, subcategory, document type and/or document retention periods. Moreover, one skilled in the art will recognize that various category options can be provided without departing from the spirit and teachings herein. For example, documents may be arranged alphabetically by name and selectable in a drop-down list by a user. Alternatively, documents may be ordered by retention period. In an alternative embodiment, information processor 102 may automatically assign document retention periods for particular documents and document types.

Once the user selects an appropriate document retention period for the document being sent, information processor 102 preferably stores the information in database 111 to ensure document retention compliance is maintained.

In the example shown in FIG. 12, links are preferably provided in section 1204 that enable a user to access account section 402, enterprise management section 406 and reports section 408, as described with reference to FIG. 4. The links provided in section 1204 provide the user with a convenient interface for quickly accessing management functionality display screens without having to navigate several unrelated display screens.

Figure 13:
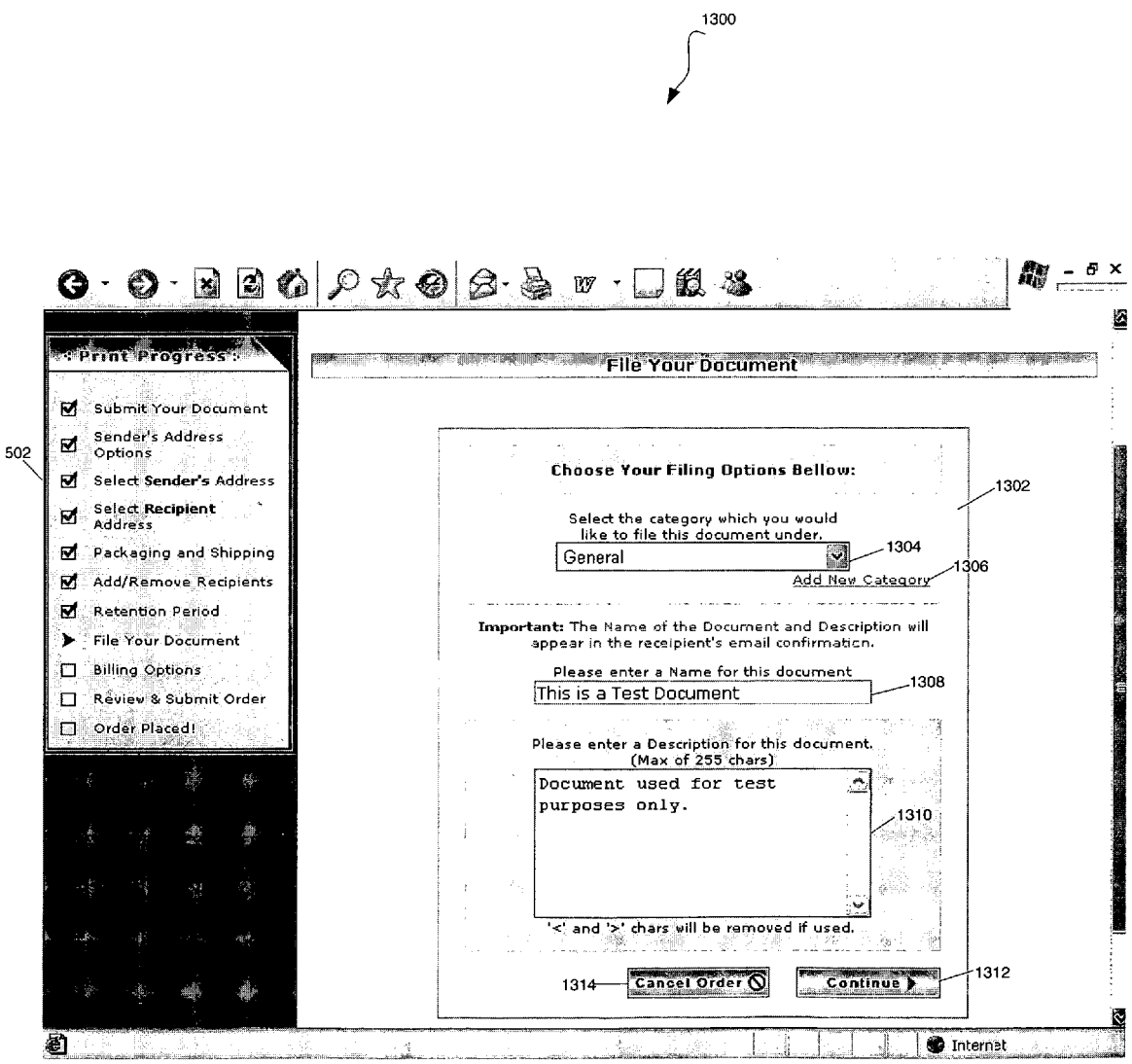
FIG. 13 shows an example document filing display screen enabling a user to categorize and store a document in a database.

After a user defines an appropriate retention period for the document being sent to a recipient, the user is preferably presented with document filing display screen 1300, substantially as shown in FIG. 13. Document filing display screen 1300 provides graphical screen controls for a user to define/select options associated with the document in database 111. In document filing section 1302, the user preferably selects drop-down list 1304 to select a category of document. In the example shown in FIG. 13, a "General" category is selected by the user. Preferably, authorized users are able to add new categories by selecting Add New Category hyperlink 1306 and submitting entries, for example, in a data entry display form for the new category, and one or more descriptions of the category. Thereafter, the user preferably submits entries in text boxes 1308 and 1310 to name and describe the document, and, thereafter selects Continue button control 1312 to proceed with the order. Alternatively, the user can select Cancel Order button control 1314 to abort the process.

Figure 14:
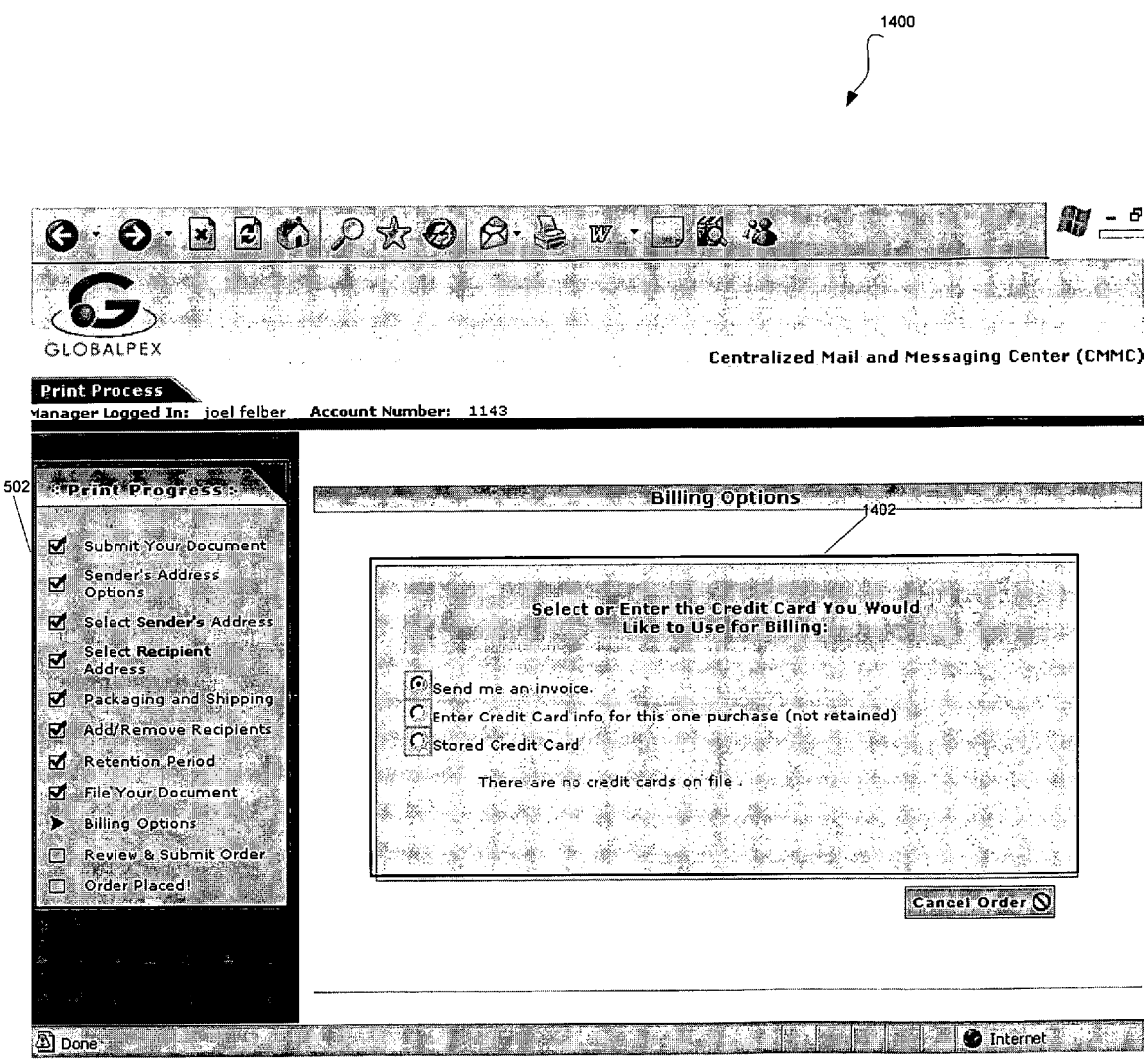
FIG. 14 illustrates an example display screen for selecting billing options in accordance with a preferred embodiment.
Figure 15:
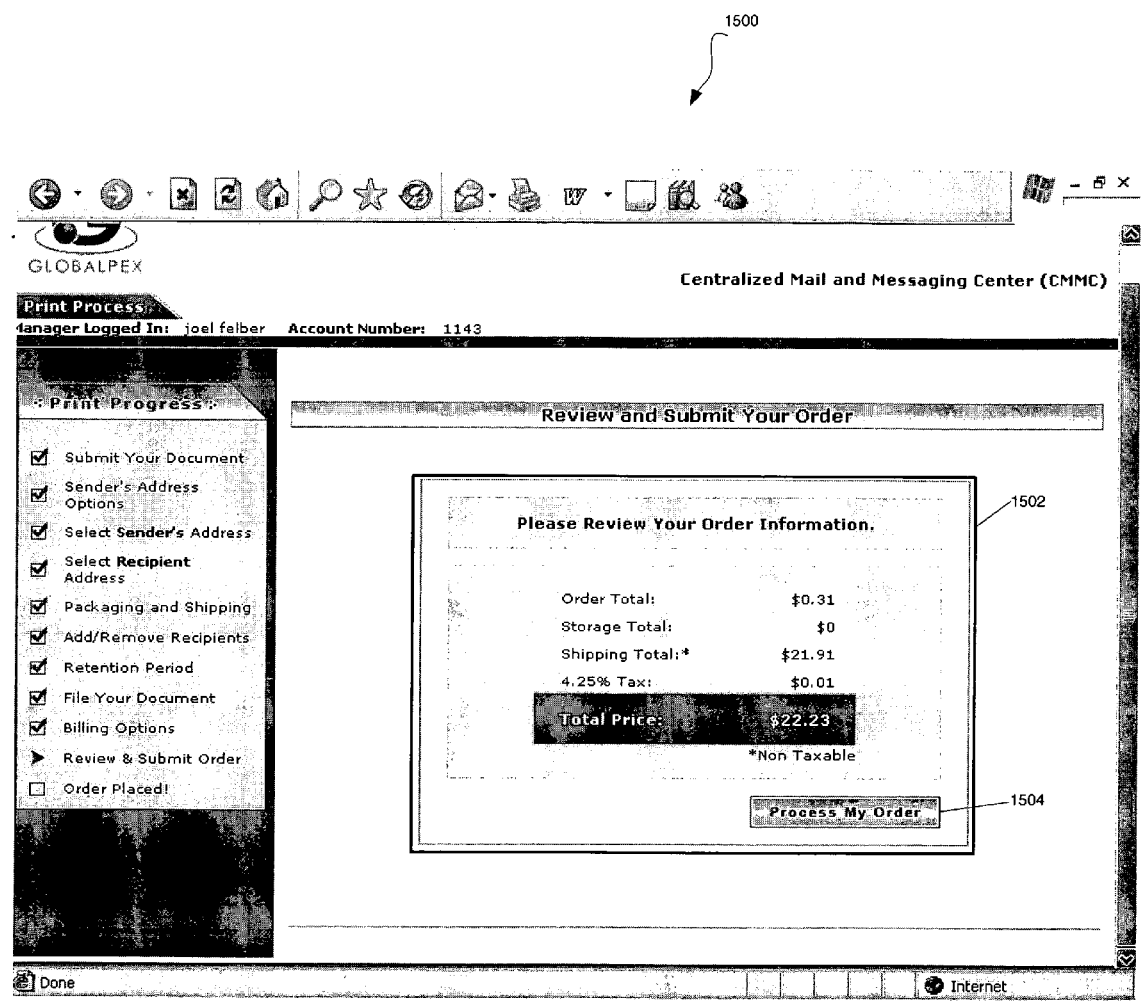
FIG. 15 illustrates an order review display screen for a user to have opportunity to review a total price for the order.

After the document is filed, the user preferably proceeds submit billing options, substantially as shown in billing options section 1402 in display screen 1400 (FIG. 14). In the example shown in FIG. 14, section 1402 provides the user with radio button control options to be invoiced, submit credit card information once for this order, or apply credit card information previously stored in database 111. Of course, one skilled in the art will recognize that alternative billing options can be provided, such as PAYPAL payments, automatic bank account debit payments, purchase order payments, or other electronic financial transaction mechanisms, as known in the art.

After the user submits a billing option, display screen 1500 (FIG. 15) is preferably displayed and the user has an opportunity to review the total price for the order in order review section 1502. When the user is satisfied with the selections, the user selects Process Order button control 1504. Once selected, the user's order is preferably submitted and processed by information processor 102 in accordance with the teachings herein.

Figure 16:
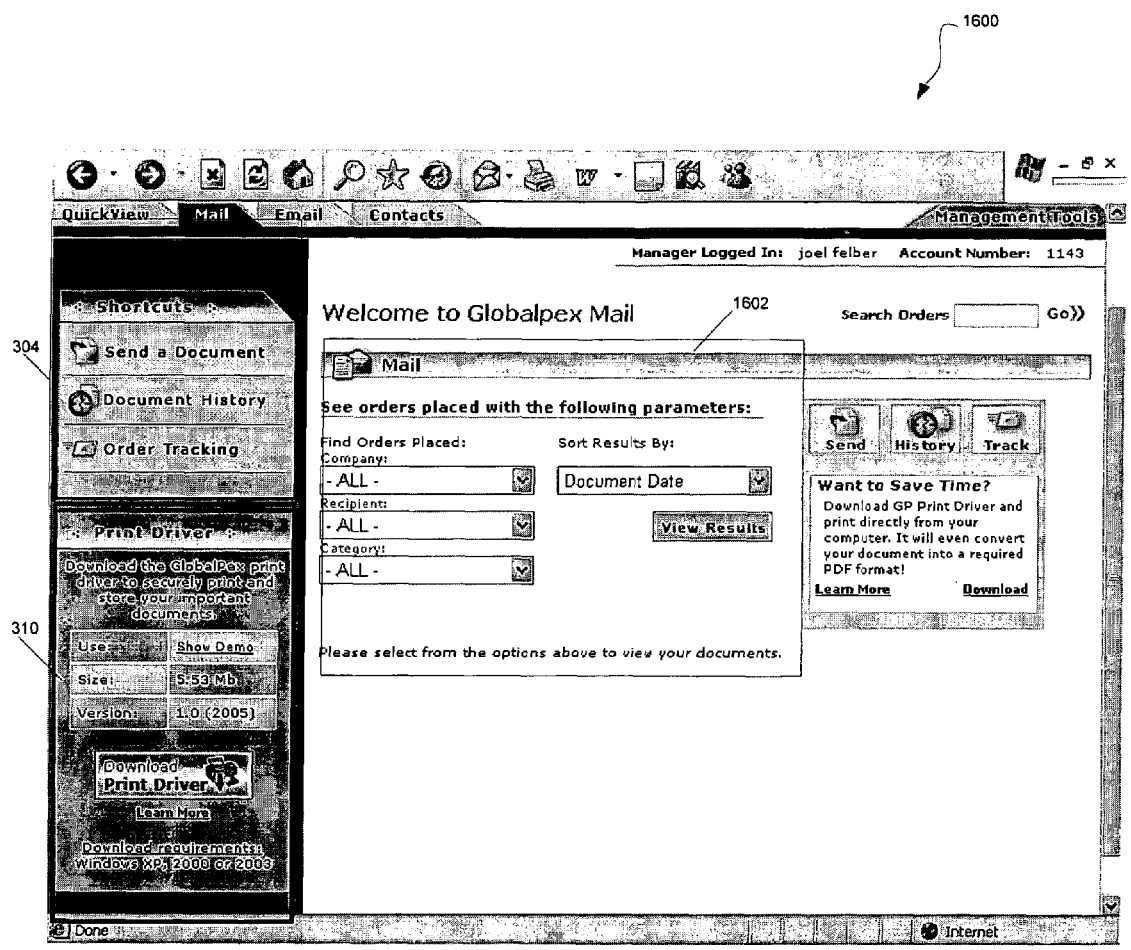
FIG. 16 shows an example order tracking display screen enabling a user to select options for tracking the status of an order placed in accordance with a preferred embodiment.

As noted above with reference to FIG. 3, a user can select an option for order tracking for previously submitted orders. As noted above, contents of physical correspondence (e.g., documents) and electronic correspondence (e.g., e-mail) can be certified using the modules and features described herein. After an order is placed, a user can track or review the status of the order (preferably for either physical correspondence or electronic correspondence), such as shown in display screen 1600 in FIGS. 16. In section 1602 of FIG. 16, a series of drop-down lists are provided to enable a user to search for a particular order. For example, the user can search for orders based on company name, recipient and/or category. Further, there is provided an option to sort search results in various ways, such as by document date.

The present invention is now further by way of an example and described with reference to FIG. 17. A customer desires to send a document to a recipient via content certified and authenticated correspondence system 100. Using customer workstation 104, the customer creates document 1702, for example, using standard word processing software. In a preferred embodiment, the user prints the document to virtual print driver 105 to convert the document to a PDF file, and to establish a communication session with information processor 102. Thereafter, document 1702 (preferably converted to PDF) is uploaded to information processor 102.

Figure 17:
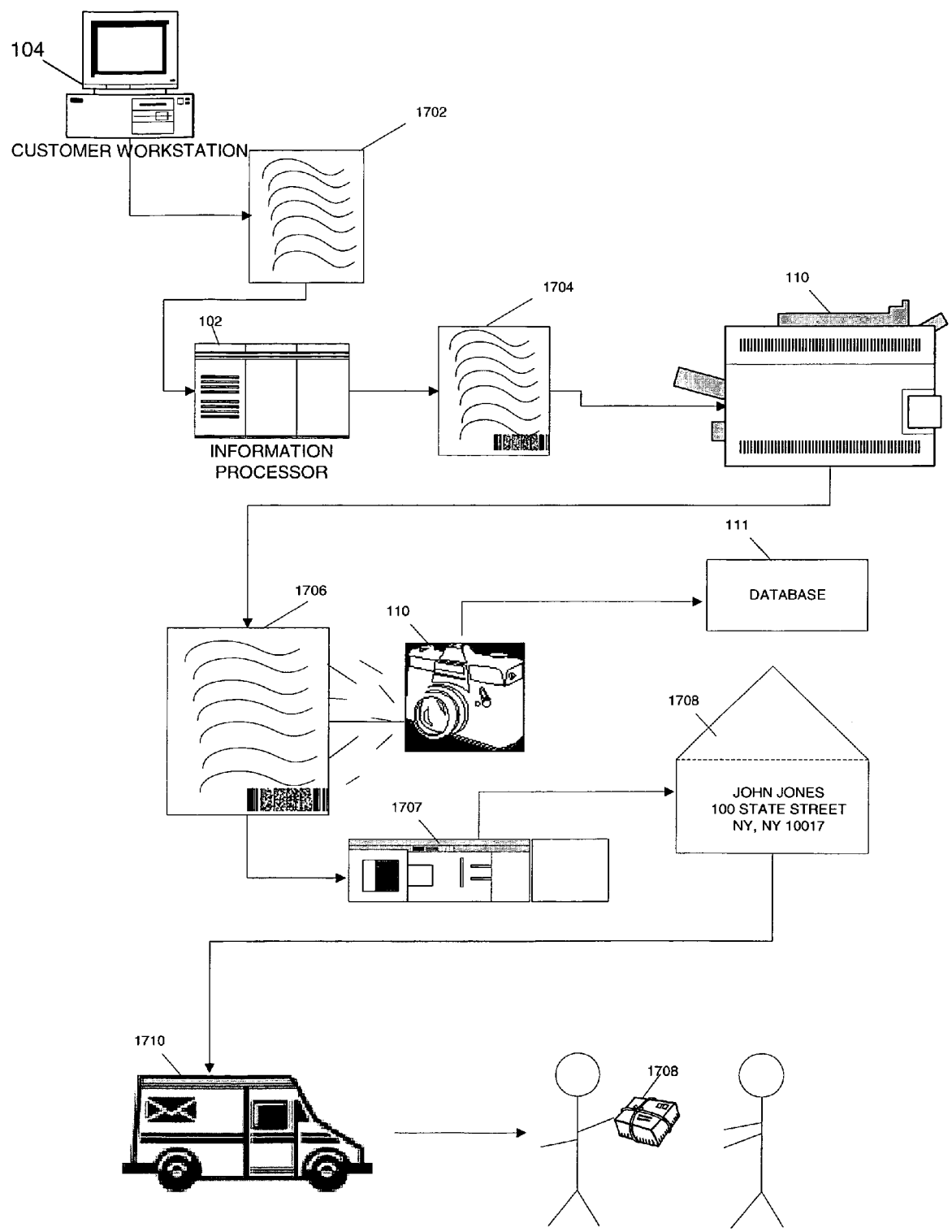
FIG. 17 illustrates steps associated with transmitting a document to a recipient in accordance with a preferred embodiment.

Continuing with the example illustrated in FIG. 17, information processor 102 preferably modifies document 1702 by adding a bar code to each and every page of the document, thereby generating bar coded document 1704. Thereafter, document 1704 is physically printed by a printer in centralized mailing and messaging center 110. In the example shown in FIG. 17, devices included in centralized mailing and messaging center 110 have reference numeral 110. Although the respective devices are each labeled with reference numeral 110, it is to be understood that these and/or other devices may be included in process. For example, the printer shown in FIG. 17 may be replaced by another device, such as a plotter or other output device.

Once the document 1704 is printed, each page is preferably imaged. In the example shown in FIG. 17, a camera is used to photograph document 1704. Of course, one skilled in the art will recognize that other imaging technology may be employed, such as a scanner, fax machine or other known device(s) to provide a digital copy of document 1704. Once document 1704 is imaged, the digital copy is preferably stored in database 111. Additionally, the physical copy of document 1706 is processed in centralized mailing and messaging center 110, such as to scan the barcodes on each page and verify that document 1706 is complete.

Thereafter, document 1706 is provided to inserting station 1707 to perform at least one of folding, binding, inserting and sealing document 1706 into an envelope. Preferably, the envelope is formatted with a clear "windowed" portion, and the first page of every package is the "airway bill," as known in the art. In this way the document can be inserted with mailing information easily viewed, without a need for human interaction, which increases the document's integrity. Alternatively, any known method of preparing document 1706 for delivery to the recipient is envisioned herein. The packaged document 1708 is preferably addressed and fees associated with delivery are preferably prepared. Once packaged document 1708 is prepared, the packaged document is delivered via courier 1710 and delivered to the recipient.

In addition to physical documents sent via courier, customers of the proprietor of information processor 102 are given an ability to send and receive content certified e-mail to anyone on the globe with the full assurances of time/date stamping, e-mail and fax receipt verification and recording. This content certification process ensures that e-mail messages are not changed or otherwise tampered with once transmitted by the sender. Preferably, a duplicate true image of the sent e-mail is created and securely stored in database 111. The image and corresponding information, such as tracking information and confirmation receipts, can be retrieved and viewed on demand by authorized personnel.

Moreover, customers are provided the ability to retain and easily retrieve all internal and external instant message communications, for example, between their employees and their instant message enabled clients. In addition to recording and retrieval, the present invention enables customers to search instant message records by user, date, and/or keyword, thus increasing the customer's ability to verify informal agreements and respond effectively to discovery and regulatory requests.

In yet another embodiment, customers have access to a fax service that preferably transmits a customer's faxed document to either a conventional fax or e-mail address, and thereafter confirms and records receipt. A copy of the faxed document, confirmation receipt; and relevant metadata (the entire record of the document including its electronic transmission and retention information) may be retained in case, for example, any aspect of the faxed document or its transmission come into question.

In still another embodiment, a Voice Over Internet Protocol ("VOIP") integration is provided for customers to use VOIP to make domestic and international calls over the internet. This service provides the customer with significant savings when compared to traditional phone services. In addition to the provision of VOIP telephone service, customers are provided the ability to see, listen, and manage multiple voices mail boxes from one single location, a computing device. Customers can use the convenience of the internet to check their voice mail from any location without having to make a call. Preferably, all voice mail messages automatically are displayed in a convenient interface and include identifying information such that the messages can be prioritized, screened, and stored without a need to listen to them. An added feature gives the customer the ability to store voice mail messages indefinitely. This feature may be activated for regulatory or litigation purposes, and comes complete with time/date stamp and caller ID information.

Yet another feature of the present invention includes inbound mail automation for business accounts. Business customers are preferably provided with the ability to direct incoming mail documents to centralized mailing and messaging center 110. Business customers may large volumes of mail (e.g., insurance claims, forms, etc) which can be directed to the centralized mailing and messaging center 110, where the documents are preferably scanned and e-mailed, thereby reducing a need for dedicated physical resources and storage space. Each e-mail preferably provides the subject, keywords, name of sender, date it was received, and the image of the scanned document. Preferably, inbound mail automation includes forwarding of physically mailed documents to centralized mailing and messaging center 110, automated envelope opening and document imaging ensuring maximum privacy, document bar coding, immediate forwarding of paper based mail to the customer's e-mail account, protection from chemical, explosive, and biological agents, and enhanced document retention/retrieval/reporting features.

In addition to providing inbound mail automation service for business customers, residential accounts are similarly supported. Residential customers can elect to have physical mail delivered to them while they are away from their home location. In accordance with a preferred embodiment, incoming physical mail is redirected to centralized mailing and messaging center 110, where inbound mail is scanned, and e-mailed to the customer. Each e-mail preferably provides the subject, name of sender, date it was received, and the image of the scanned document. In addition to the convenience of having residential (home) physical mail directed to their e-mail address, residential clients can elect to restrict their receipt of "junk mail." Other features of this service include forwarding residential mail to centralized mailing and messaging center 110, imaging of each mailed document, ensuring maximum privacy, document bar coding, imaged document storage, timely forwarding of paper based mail to the customer's e-mail account, and integrated reporting features.

Thus, the present invention provides a comprehensive, user-friendly and encompassing document tracking and content verification solution, enabling corporations to be in full compliance with the myriad and far reaching regulations mandated by the various law, acts and directives.

Other uses and products provided by the present invention will be apparent to those skilled in the art. Although the present invention has been described in relation to particular embodiments thereof, many other variations and modifications and other uses will become apparent to those skilled in the art. It is preferred, therefore, that the present invention be limited not by the specific disclosure herein.

What is claimed:

1. A method for certifying contents of a correspondence sent from a sender to a recipient, the method comprising:
receiving by an information processor over a communication network an electronic file from a sending workstation associated with the correspondence;
receiving over the communication network recipient information that represents the recipient of the correspondence;
generating an electronic copy of the electronic file, and identifying the electronic copy with identifying coded information;
outputting the coded electronic copy as a physical document;
imaging the physical document to create an electronic imaged copy thereof;
storing the electronic imaged copy in a database;
delivering the physical document to the recipient; and
retaining the electronic imaged copy stored in the database as a certification of the contents of the correspondence as embodied in the physical document sent to the recipient.

2. The method of claim 1, futher comprising providing by the information processor a graphical user of the workstation to upload the electronic file.

3. The method of claim 2, wherein the user interface further comprises graphical screen controls enabling a user to define parameters related to the correspondence.

4. The method of claim 3, wherein the parameters in clude at least one of a paper color, paper size, paper type and envelope type.

5. The method of claim 1, wherein the identifying coded information is formatted as a bar code.

6. The method of claim 5, wherein the bar code is a 2D bar code.

7. The method of claim 1, further comprising automatically preparing the physical document to be inserted in an envelope with viewable mailing information.

8. The method of claim 7, wherein the envelope comprises a transparent portion.

9. The method of claim 1, wherein the electronic file is generated by virtual print driver installed on the workstation.

10. The method of claim 1, wherein the step of delivering the correspondence comprises receiving cost estimate information from a plurality of couriers, and selecting one of the couriers.

11. The method of claim 1, further providing enabling a user to review status information related to the correspondence.

12. The method of claim 1, wherein the correspondence is sent by e-mail.

13. The method of claim 1, further comprising authenticating a user of the service.

14. The method of claim 1, further comprising performing optical character recognition on the electronic copy of the electronic file.

15. The method of claim 1, wherein the retaining ensures compliance with at least one governmental regulation.

16. The method of claim 1, wherein at least one of the receiving, generating, outputting, imaging, storing, delivering and retaining are provided by an integrated mail and messaging center.

17. A system for certifying contents of a correspondence sent from a sender to a recipient, the system comprising:
an information processor communicating over a communication network and operable to receive an electronic file and recipient information from a sending workstation associated with the correspondence, wherein the recipient information represents the recipient of the correspondence;
a copy generating module operable to generate an electronic copy of the electronic file, and to identify the electronic copy with identifying coded information;
an output device operable to output the coded electronic copy as a physical document;
an imaging device operable to image the physical document to create an electronic imaged copy thereof;
a database operable to store the electronic imaged copy;
a delivery module operable to deliver the physical document to the recipient; and
a retention module operable to retain the electronic imaged copy stored in the database as a certification of the contents of the correspondence as embodied in the physical document sent to the recipient.

18. The system of claim 17, further comprising a graphical user interface enabling a user of the workstation to upload the electronic file.

19. The system of claim 18, wherein the user interface further comprises graphical screen controls enabling a user to define parameters related to the correspondence.

20. The system of claim 19, wherein the parameters include at least one of a paper color, paper size, paper type and envelope type.

21. The system of claim 18, wherein the user interface further enables a user to review status information related to the correspondence.

22. The system of claim 17, wherein the identifying coded information is formatted as a bar code.

23. The system of claim 22, wherein the bar code is a 2D bar code.

24. The system of claim 17, further comprising a centralized mailing and messaging center that substantially automatically prepares the physical document to be inserted in a envelope with viewable mailing information.

25. The system of claim 24, wherein the envelope comprises a transparent portion.

26. The system of claim 17, further comprising a virtual print driver operable to generate the electronic file.

27. The system of claim 17, wherein the delivery module receives cost estimate information from a plurality of couriers.

28. The system of claim 17, wherein the correspondence is sent by e-mail.

29. The system of claim 17, further comprising an optical character recognition module for performing optical character recognition on the electronic copy of the electronic file.

30. The system of claim 17, wherein the retention module provides compliance with at least one government regulation.

31. The system of claim 17, further comprising an e-commerce module operable to receive a fee for certifying contents of a correspondence sent from a sender to a recipient.

32. A system for certifying contents of a correspondence sent from a sender to a recipient, the system comprising an integrated messaging center for
receiving an electronic file;
reproducing the electronic file with coded information;
physically outputting the reproduced file as a physical document for the correspondence;
imaging the physical document to create an electronic imaged copy;
storing the electronic imaged copy in a database;

processing the physical document; and retaining the electronic imaged copy stored in the database, wherein the retained electronic imaged copy ensures compliance with at least one governmental regulation, and further certifies the contents of the correspondence as embodied in the physical document.

* * * * *